United States Patent
Yamaki et al.

(10) Patent No.: US 12,493,520 B2
(45) Date of Patent: Dec. 9, 2025

(54) MEMORY SYSTEM GENERATING ERROR CORRECTION CODE PARITY BASED ON RANK

(71) Applicant: Kioxia Corporation, Tokyo (JP)

(72) Inventors: Ryo Yamaki, Kanagawa (JP); Masanobu Shirakawa, Kanagawa (JP)

(73) Assignee: Kioxia Corporation, Tokyo (JP)

( * ) Notice: Subject to any disclaimer, the term of this patent is extended or adjusted under 35 U.S.C. 154(b) by 41 days.

(21) Appl. No.: 18/604,940

(22) Filed: Mar. 14, 2024

(65) Prior Publication Data

US 2024/0320091 A1   Sep. 26, 2024

(30) Foreign Application Priority Data

Mar. 22, 2023   (JP) ................................. 2023-046001

(51) Int. Cl.
G06F 11/00 (2006.01)
G06F 11/10 (2006.01)

(52) U.S. Cl.
CPC ...... *G06F 11/1068* (2013.01); *G06F 11/1016* (2013.01)

(58) Field of Classification Search
CPC . G11C 2029/0411; G11C 29/42; G11C 29/02; G06F 11/1048; G06F 11/1068; G06F 11/108; G06F 11/1044; G06F 11/1016; G06F 2212/403; G06F 2212/202; G06F 2212/2022; G06F 2212/205
See application file for complete search history.

(56) References Cited

U.S. PATENT DOCUMENTS

| | | | |
|---|---|---|---|
| 8,117,519 B2* | 2/2012 | Ito | G11C 11/4096 714/766 |
| 9,070,436 B2 | 6/2015 | Ordentlich et al. | |
| 9,646,706 B2* | 5/2017 | So | G11C 29/021 |
| 9,786,387 B2* | 10/2017 | Cha | G11C 29/52 |
| 9,837,156 B2* | 12/2017 | Seol | G11C 7/1006 |
| 10,482,990 B2* | 11/2019 | Hoya | G06F 11/106 |
| 10,484,019 B2* | 11/2019 | Weinberg | H03M 13/2906 |
| 11,347,584 B2 | 5/2022 | Shirakawa et al. | |
| 11,546,000 B2* | 1/2023 | Berman | G11C 11/54 |

(Continued)

OTHER PUBLICATIONS

Gabidulin "Rank Codes", TUM. University Press, May 2021, 184 pages.

(Continued)

*Primary Examiner* — Esaw T Abraham
(74) *Attorney, Agent, or Firm* — Maier & Maier, PLLC

(57) ABSTRACT

A memory system includes a memory and a memory controller. The memory controller includes an encoder including a first encoder configured to generate a first codeword from a plurality of first data sections. The first codeword includes a first error correction code parity for correcting errors in number based on a rank in the plurality of first data sections and the first codeword. The first codeword includes a plurality of first bit strings respectively associated with a plurality of columns. The first bit strings each include a plurality of bits respectively associated with a plurality of rows. The memory controller is configured to write the plurality of first bit strings into the plurality of magnetic bodies, respectively, such that the magnetic body in which one of the first bit strings is written is different.

19 Claims, 18 Drawing Sheets

(56) References Cited

U.S. PATENT DOCUMENTS

| | | | |
|---|---|---|---|
| 11,567,831 B2 * | 1/2023 | Laurent | G06F 11/1076 |
| 11,636,912 B2 * | 4/2023 | Berman | G11C 29/40 |
| | | | 365/185.09 |
| 12,204,410 B2 * | 1/2025 | Sutera | G06F 11/1048 |
| 2015/0248332 A1 | 9/2015 | Ordentlich et al. | |
| 2021/0294527 A1 | 9/2021 | Aiba et al. | |

OTHER PUBLICATIONS

Hagiwara "Network error-correcting codes called modern algebraic codes", Kyoto University RIMS Kôkyûroku, vol. 1956, 2015, 36 pages.

Gabidulin, "Theory of codes with-maximum rank distance", Problems of Information Transmission, vol. 21, No. 1, 1985, 14 pages.

\* cited by examiner

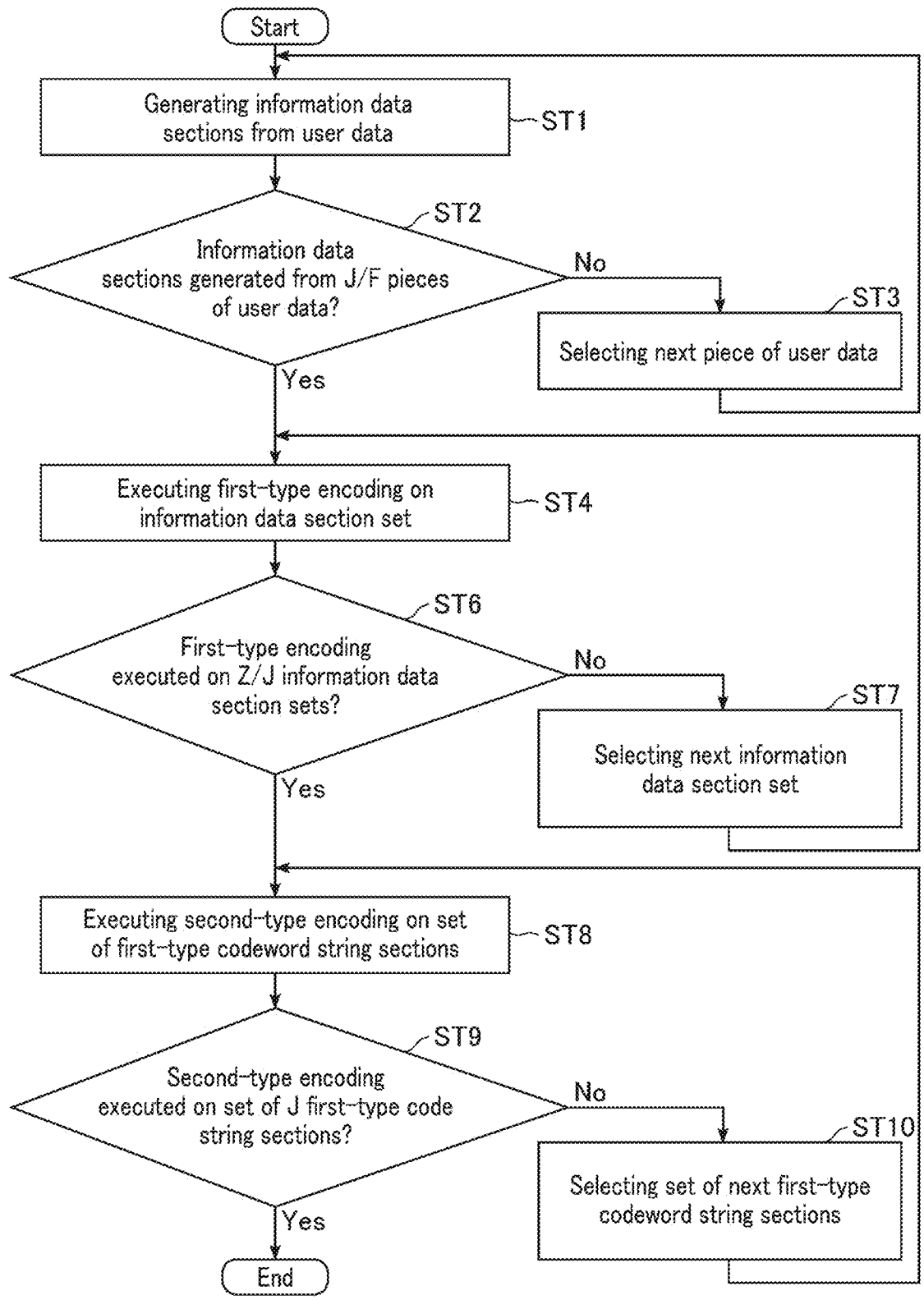
F I G. 19

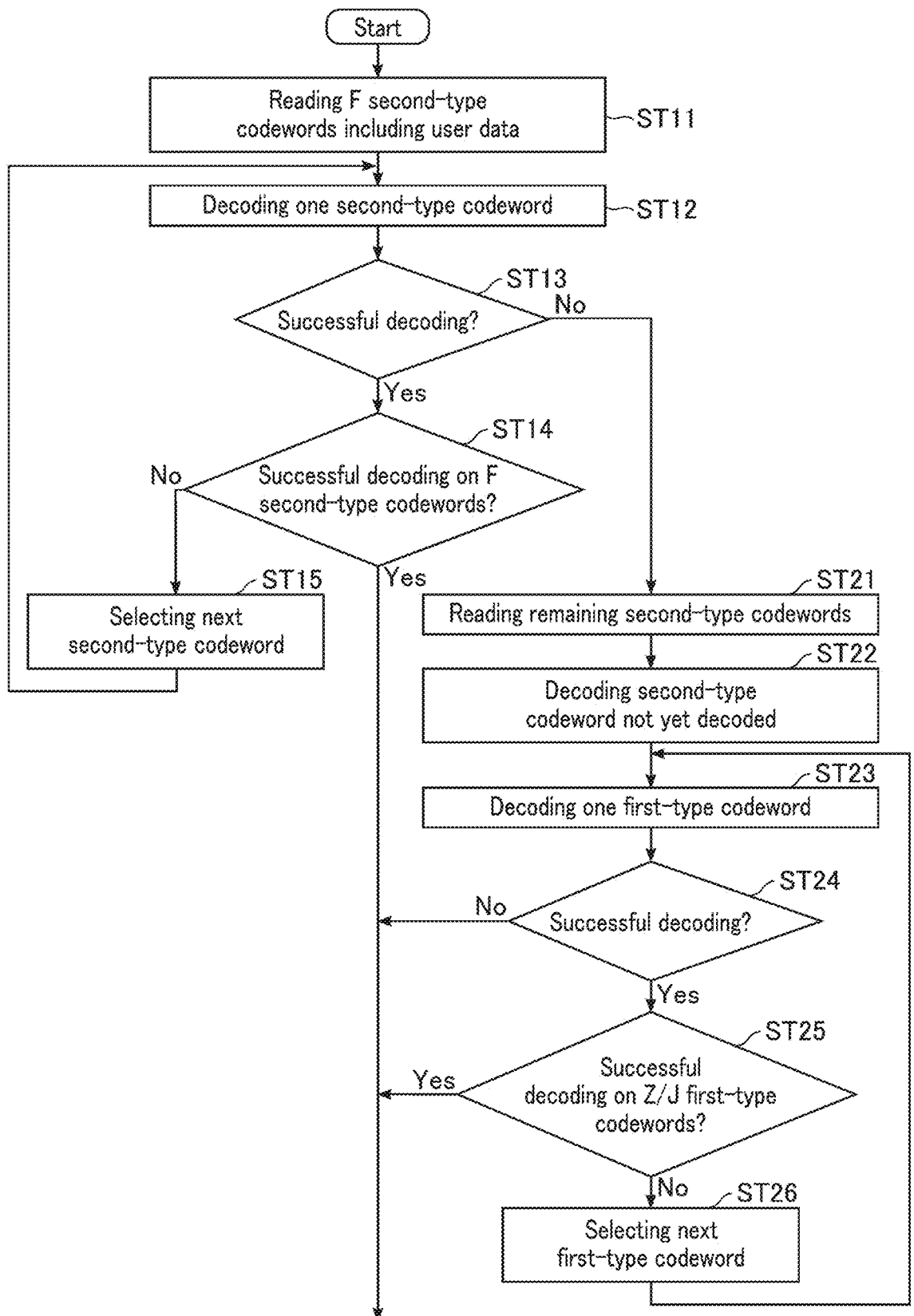
F I G. 20

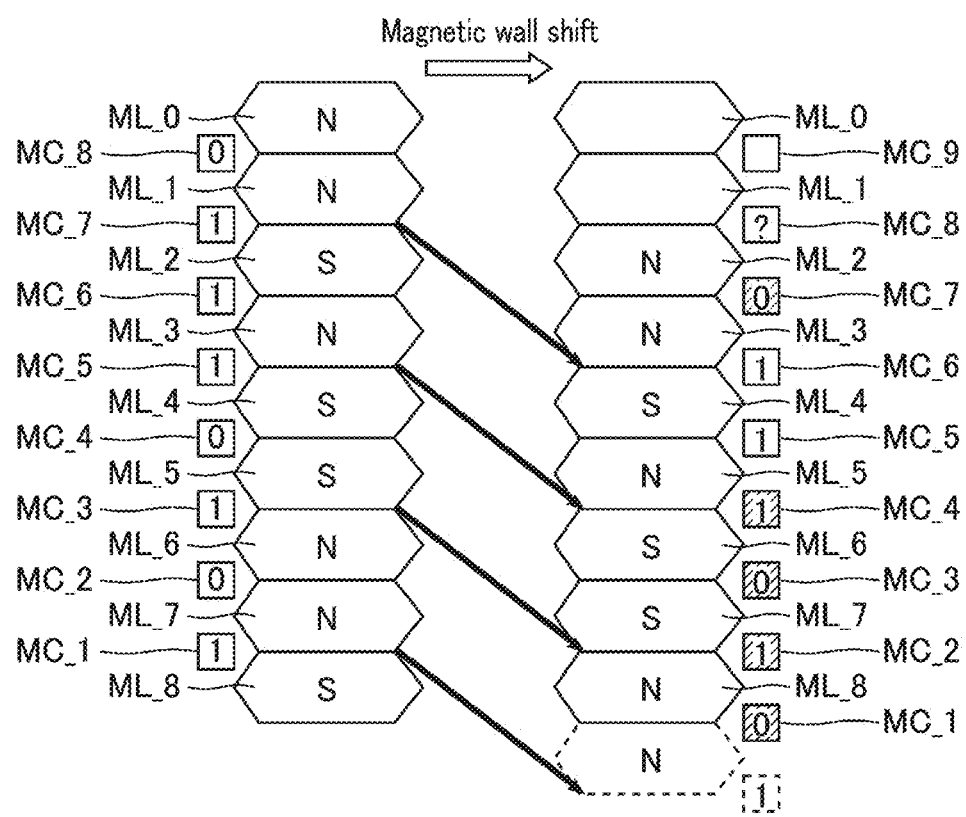
F I G. 22

MEMORY SYSTEM GENERATING ERROR CORRECTION CODE PARITY BASED ON RANK

CROSS-REFERENCE TO RELATED APPLICATIONS

This application is based upon and claims the benefit of priority from Japanese Patent Application No. 2023-46001, filed Mar. 22, 2023, the entire contents of which are incorporated herein by reference.

FIELD

Embodiments described herein relate generally to a memory system.

BACKGROUND

A memory system including a memory and a memory controller is known. Examples of the memory include a magnetic memory using a magnetic thin wire.

BRIEF DESCRIPTION OF THE DRAWINGS

FIG. 19 shows a flow of a certain operation in the memory system according to the first embodiment.

FIG. 20 shows a flow of a certain operation in the memory system according to the first embodiment.

FIG. 22 shows a second pattern of an unintended domain wall shift in the magnetic memory.

DETAILED DESCRIPTION

Figure 1:
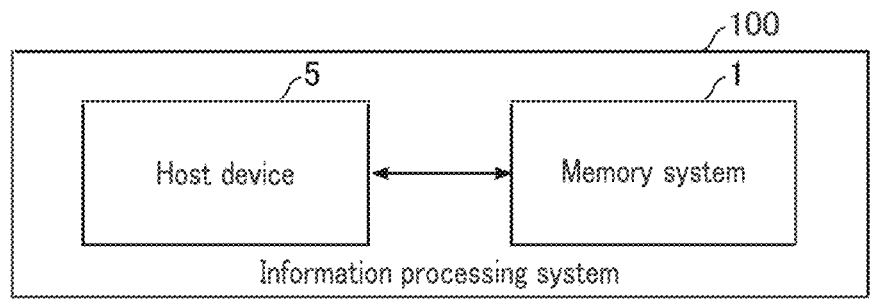
FIG. 1 shows functional blocks of an information processing system including a memory system according to a first embodiment.

In general, according to one embodiment, a memory system includes a memory and a memory controller. The memory includes a plurality of magnetic bodies extending in a first direction. The magnetic bodies each includes a plurality of portions aligned in the first direction. The memory controller includes an encoder including a first encoder configured to generate a first codeword from a plurality of first data sections. The first codeword includes a first error correction code parity for correcting errors in number based on a rank in the plurality of first data sections and the first codeword. The first codeword includes a plurality of first bit strings respectively associated with a plurality of columns. The first bit strings each include a plurality of bits respectively associated with a plurality of rows. The memory controller is configured to write the plurality of first bit strings into the plurality of magnetic bodies, respectively, such that the magnetic body in which one of the first bit strings is written is different from those in which another one of the first bit strings is written.

Embodiments will now be described with reference to the figures. In order to distinguish components having substantially the same function and configuration in an embodiment or over different embodiments from each other, an additional numeral or letter may be added to the end of each reference numeral or letter.

Each functional block may be implemented as hardware, computer software, or their combination. It is not necessary that functional blocks be distinguished as in the following examples. Some of the functions may be implemented by functional blocks different from those illustrated below. Furthermore, an illustrated functional block may be divided into functional sub-blocks.

Steps in the flow of a method according to an embodiment are not limited to any of the illustrated orders, and may occur in an order different from the illustrated orders and/or may occur concurrently with another step or steps.

The specification and the claims, when mentioning that a particular (first) component is "coupled" to another (second) component, intend to cover both the form of the first component directly coupled to the second component and the form of the first component coupled to the second component via one or more components which are always or selectively conductive.

1. First Embodiment

1.1. Configuration (Structure)
1.1.1. Information Processing System

FIG. 1 shows functional blocks of an information processing system including a memory system according to a first embodiment. An information processing system 100 includes a memory system 1 and a host device 5.

The memory system 1 is a system configured to store data. The memory system 1 receives a data writing request from the host device 5 and stores requested data. The memory system 1 receives a data reading request from the host device 5 and transmits requested data to the host device 5.

The host device 5 requests the memory system 1 to read data and write data in units of a size of U bytes. U is a positive integer. Hereinafter, U bytes may be referred to as a "sector".

1.1.2. Memory System

Figure 2:
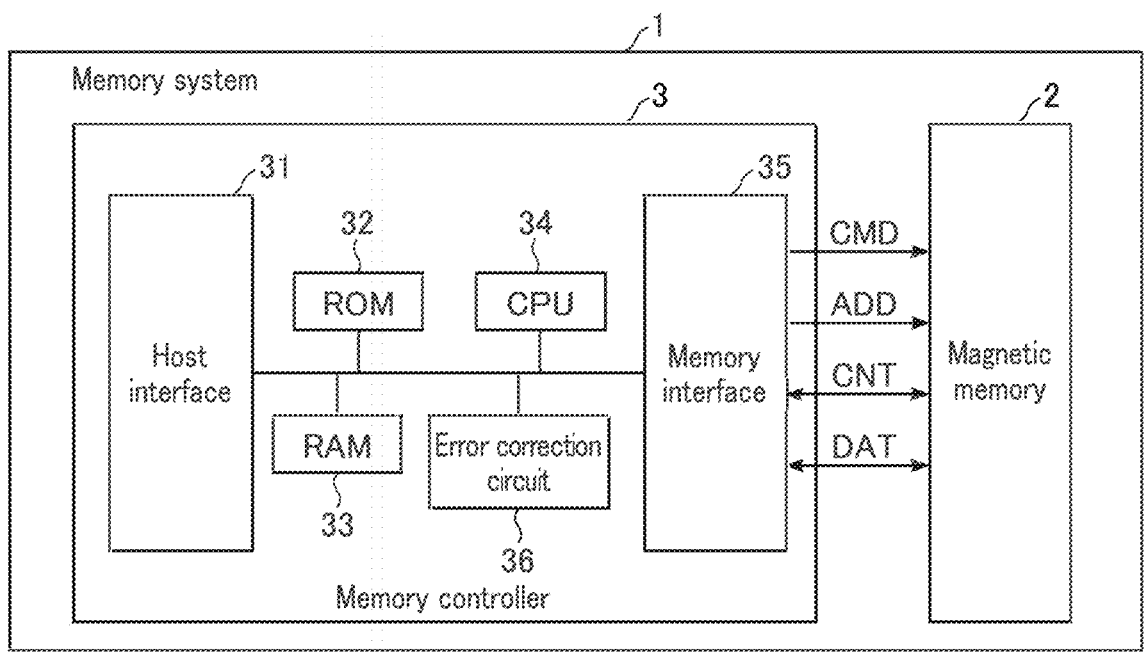
FIG. 2 shows functional blocks and coupling between the functional blocks of the memory system according to the first embodiment.

FIG. 2 shows functional blocks and coupling between the functional blocks of the memory system 1 according to the first embodiment. As shown in FIG. 2, the memory system 1 includes a magnetic memory 2 and a memory controller 3.

The magnetic memory 2 is a device configured to store data in a nonvolatile manner using magnetization. The magnetic memory 2 includes a magnetic body having a plurality of magnetic domains and configured to store data using a magnetization orientation of a magnetic domain. The magnetic domain is a region partitioned by magnetic walls. To store data in a memory cell MC with a designated address and to read data therefrom, the magnetic memory 2 shifts a domain wall. A magnetic memory, such as the magnetic memory 2, which is configured to store data using a magnetic domain and shift a domain wall, may also be referred to as a "domain wall shift memory" or a "race track memory".

The memory controller 3 is a controller configured to control the magnetic memory 2. The memory controller 3 exerts, over the magnetic memory 2, control for execution of data reading and data writing based on a request from the host device 5.

The memory controller 3 includes functional blocks such as a host interface 31, a read only memory (ROM) 32, a random access memory (RAM) 33, a central processing unit (CPU) 34, a memory interface 35, and an error correction circuit 36.

The memory controller 3 functions, based on an operation in execution, as a sub portion such as encoding controller, decoding controller, an error correction controller, a write controller, a read controller, a signal transmission controller, a signal reception controller, etc. The error correction controller controls an overall processing performed for error correction, and performs data division, data coupling, temporal data storage, data supply, control over the encoding controller, and control over the decoding controller. The encoding controller controls encoding. The decoding controller controls decoding. The write controller controls processing for writing data into the magnetic memory 2, and performs preparation of data to be written into the magnetic memory 2 and generation of a command CMD for writing and an address information ADD. The read controller controls processing for reading data from the magnetic memory 2, and performs generation of a command CMD for reading and an address information ADD for specifying data, based on data to be read from the magnetic memory 2. The signal transmission controller controls transmission of a signal including data DAT, a command CMD, address information ADD, and a control signal CNT to the magnetic memory 2, and controls the memory interface 35. The signal reception controller controls reception of signals including data DAT and a control signal CNT from the magnetic memory 2, and controls the memory interface 35.

The host interface 31 is an interface for the memory controller 3 to communicate with the host device 5. The host interface 31 may be configured of hardware, or a combination of hardware and software. The host interface 31 is coupled to the host device 5 via an interconnect for enabling communications according to a scheme (or a standard) which the host interface 31 and the host device 5 comply with.

The ROM 32 is a nonvolatile memory. The ROM 32 stores programs including firmware.

The RAM 33 is a volatile memory. The RAM 33 temporarily stores data, and stores programs stored in the ROM 32 while the memory system 1 is being supplied with a power supply. Examples of the RAM 33 include a dynamic random access memory (DRAM). The RAM 33 further functions as a working memory while the memory controller 3 is in operation.

The CPU 34 is a circuit configured to control the overall operation of the memory controller 3. Through execution of programs stored in the ROM 32 and loaded onto the RAM 33 by the CPU 34, the memory controller 3 executes various operations and functions as various sub portions. The firmware is configured to allow the CPU 34 to perform operations that will be described in the embodiments.

The memory interface 35 is an interface for the memory controller 3 to communicate with the magnetic memory 2. The memory interface 35 may be configured of hardware, or a combination of hardware and software. The memory interface 35 is coupled to the magnetic memory 2 via an interconnect for enabling communications according to a scheme which the magnetic memory 2 and the memory controller 3 comply with. The memory interface 35 transmits a command CMD and address information ADD to the magnetic memory 2. The memory interface 35 transmits a control signal CNT and data DAT to the magnetic memory 2, and receives the control signal CNT and the data DAT.

The command CMD indicates an operation to be executed by the magnetic memory 2. The address information ADD specifies one or more memory cells MC in the magnetic memory 2, and includes a row address and a column address of a memory cell MC. The control signal CNT is a signal for controlling an operation timing between the magnetic memory 2 and the memory controller 3, and an internal operation timing of the magnetic memory 2.

The error correction circuit 36 detects and corrects an error in data which will be written into and thereafter read from the magnetic memory 2 by using an error correction code (ECC). The error correction circuit 36 generates a parity (error correction code parity) based on data to be written into the magnetic memory 2. Hereinafter, data based on which the error correction code parity is generated may be referred to as "information data". The error correction circuit 36 adds, to information data to be written, the error correction code parity generated from the information data. The error correction circuit 36 generates an error correction code parity for each section of a certain size of the information data received by the error correction circuit 36. A combination of given information data and correction code parity generated from the information data will be referred to as a codeword. The codeword is written into the magnetic memory 2. In a case where data read from the magnetic memory 2 contains an error, the error correction circuit 36 corrects the error using the error correction code parity, and retrieves the information data. The error correction circuit 36 may be implemented as an independent, dedicated semiconductor chip, may be a circuit formed on a semiconductor substrate, or may be implemented through execution of firmware by the CPU 34.

1.1.3. Magnetic Memory

Figure 3:
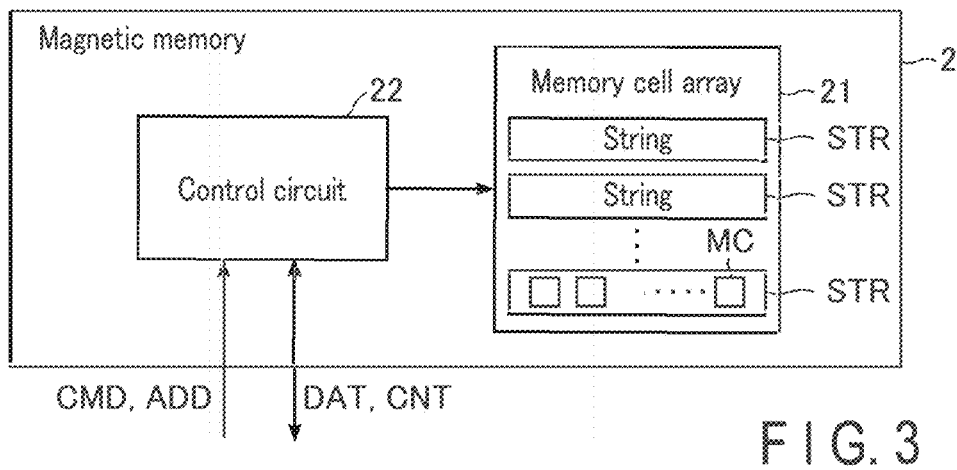
FIG. 3 shows functional blocks and coupling between the functional blocks of a magnetic memory of the memory system according to the first embodiment.

FIG. 3 shows functional blocks and coupling between the functional blocks of a magnetic memory of the memory system according to the first embodiment. As shown in FIG. 3, the magnetic memory 2 includes functional blocks such as a memory cell array 21 and a control circuit 22.

The memory cell array 21 includes a plurality of strings STR. Each string STR includes a plurality of memory cells MC. Each memory cell MC is capable of storing one-bit data in a nonvolatile manner and includes magnetic material. In the memory cell array 21, interconnects such as a plurality of source lines SL, a plurality of bit lines BL, and a plurality of field lines FL, are positioned. The interconnects are not shown in FIG. 3.

The control circuit 22 is a circuit configured to control operation of the magnetic memory 2. The control circuit 22 receives a control signal CNT, a command CMD, address information ADD, and data DAT from the memory controller 3. The control circuit 22 transmits the control signal CNT and the data DAT to the memory controller 3. The data DAT is write data in the case of writing data into the magnetic memory 2. The data DAT is read data in the case of data reading from the magnetic memory 2. Based on control indicated by the control signal CNT and the command CMD, the control circuit 22 controls data writing into the memory cell array 21 and data reading from the memory cell array 21. The control circuit 22 includes sub portions such as an input/output circuit, a sequencer, a state machine, a controller, a command decoder, an address decoder, a latch circuit, a driver, a voltage generator, a multiplexer, and a switch circuit.

1.1.4. Memory Cell Array

Figure 4:
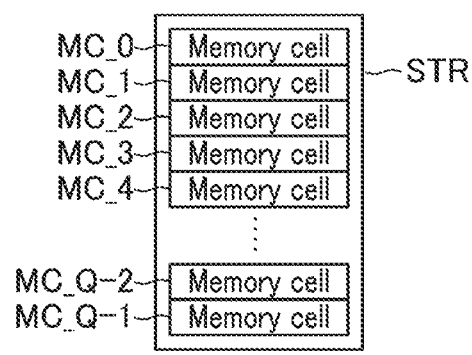
FIG. 4 shows components of a memory cell array of the memory system according to the first embodiment.

FIG. 4 shows components of a memory cell array of the memory system according to the first embodiment. As shown in FIG. 4, each string STR includes Q memory cells MC_0 to MC_Q-1. Q is a positive integer. In each string STR, memory cells MC of the string STR concerned are each formed by a single magnetic thin wire.

Figure 5:
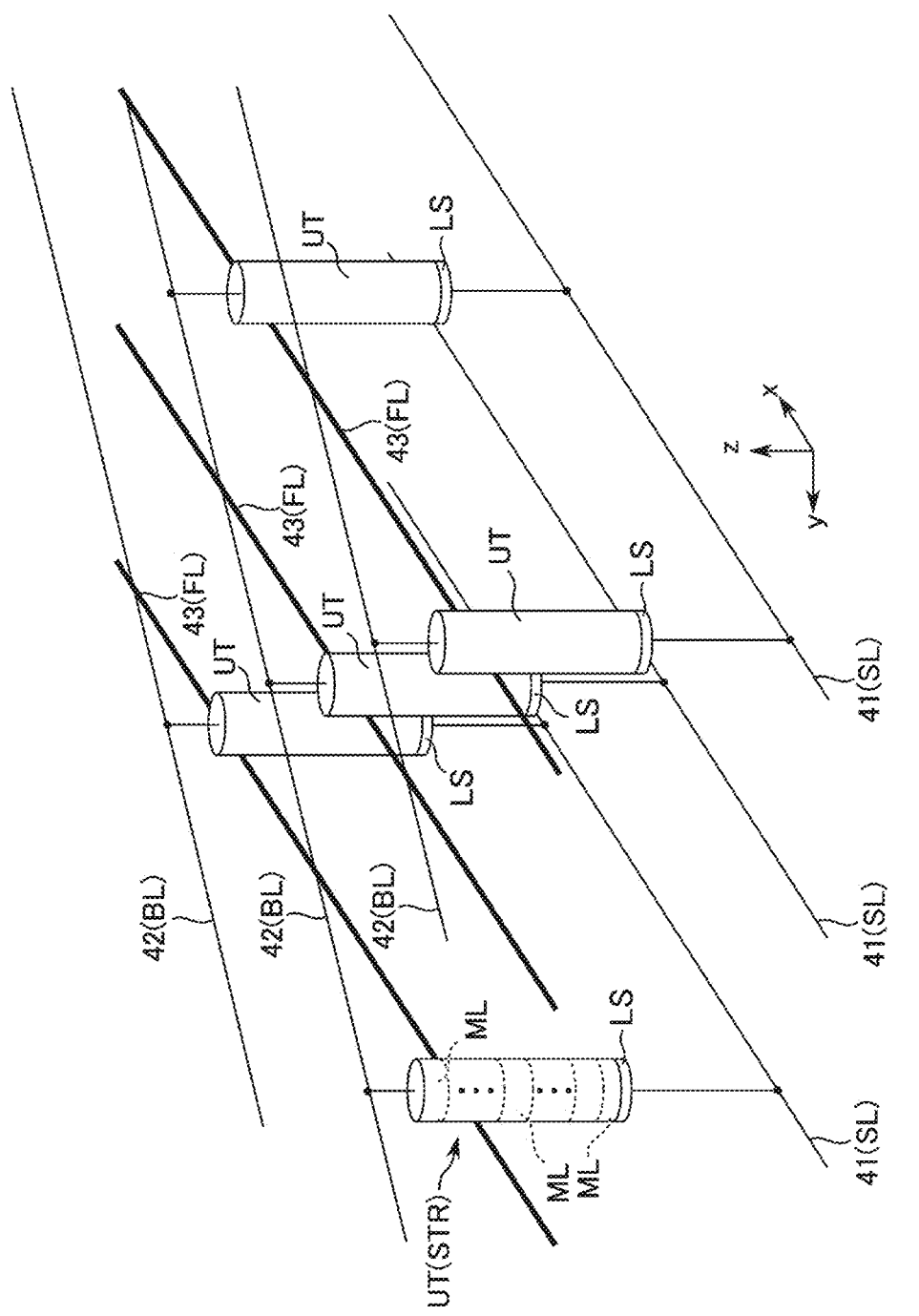
FIG. 5 shows a partial structure of the memory cell array of the memory system according to the first embodiment.

FIG. 5 shows a partial structure of the memory cell array of the memory system according to the first embodiment. FIG. 5 uses an xyz orthogonal coordinate system. The direction toward a larger coordinate on an x axis may be referred to as an "x direction". The direction toward a larger coordinate on a y axis may be referred to as a "y direction". The direction toward a larger coordinate on a z axis may be referred to as a "z direction". The term "low" and its derivative and relevant terms refer to a position at a smaller coordinate on the z axis, and the term "up" and its derivative and relevant terms refer to a position at a larger coordinate on the z axis.

As shown in FIG. 5, the memory cell array 21 includes a plurality of magnetic bodies UT and a plurality of layer stacks LS. Furthermore, in the memory cell array 21, a plurality of conductors 41, a plurality of conductors 42, and a plurality of conductors 43 are positioned.

The magnetic bodies UT are aligned in the x direction and the y direction. The magnetic bodies UT each have a linear shape and extend in the z direction. Each magnetic body UT functions as a single string STR. Each magnetic body UT includes a plurality of unit portions ML. The respective unit portions ML are aligned one by one in the direction in which the magnetic bodies UT extend, and are each in contact with an adjacent unit portion ML.

Each of the layer stacks LS includes a plurality of magnetic bodies and a plurality of insulators. The plurality of magnetic bodies and the plurality of insulators each have a layer shape and are aligned in the z direction. Each of the layer stacks LS includes a structure functioning as a switching element and a structure functioning as a magnetic tunneling junction (MTJ) element. The structure functioning as an MTJ element is positioned on the upper surface of the structure functioning as the switching element. Each of the layer stacks LS is in contact with a lower surface of a single magnetic body UT. The structure functioning as an MTJ element includes an MTJ, two ferromagnetic bodies, and an insulator between the two ferromagnetic bodies. The structure functioning as a switching element controls electrical conduction and non-conduction between both ends of the switching element.

Each of the conductors 41 is positioned further in the direction opposite to the z direction than the set of layer stacks LS. The conductors 41 extend in the x direction and are aligned in the y direction. Each of the conductors 41 functions as a single source line SL. Each of the conductors 41 is coupled to the lower surfaces of the layer stacks LS aligned in the y direction.

Each of the conductors 42 is positioned further in the z direction than the set of the magnetic bodies UT. The conductors 42 run along the plane formed by the x axis and the y axis (that is, the xy plane) and extend in the direction intersecting the x axis and the y axis. The conductors 42 run along the xy plane and are aligned in the direction intersecting the xy plane, that is, the direction orthogonal to the xy plane. Each of the conductors 42 functions as a single bit line BL. Each of the conductors 42 is coupled to the upper surface of each of the magnetic bodies UT different from the magnetic bodies UT coupled to a single conductor 41.

The conductors 43 extend in the x direction. Each of the conductors 43 extends along the unit portions ML each positioned in the upper end of each of the magnetic bodies UT aligned in the x direction. Each of the conductors 43 has a space from the unit portions ML each positioned in the upper end of each of the magnetic bodies UT aligned in the x direction. Each of the conductors 43 functions as a single field line FL. By a current flowing through a conductor 43 during data writing, a magnetic field is caused in the periphery of the conductor 43. By this magnetic field, the unit portions ML each aligned with a space from the conductor 43 are given magnetization in a direction based on the direction of the magnetic field.

Figure 6:
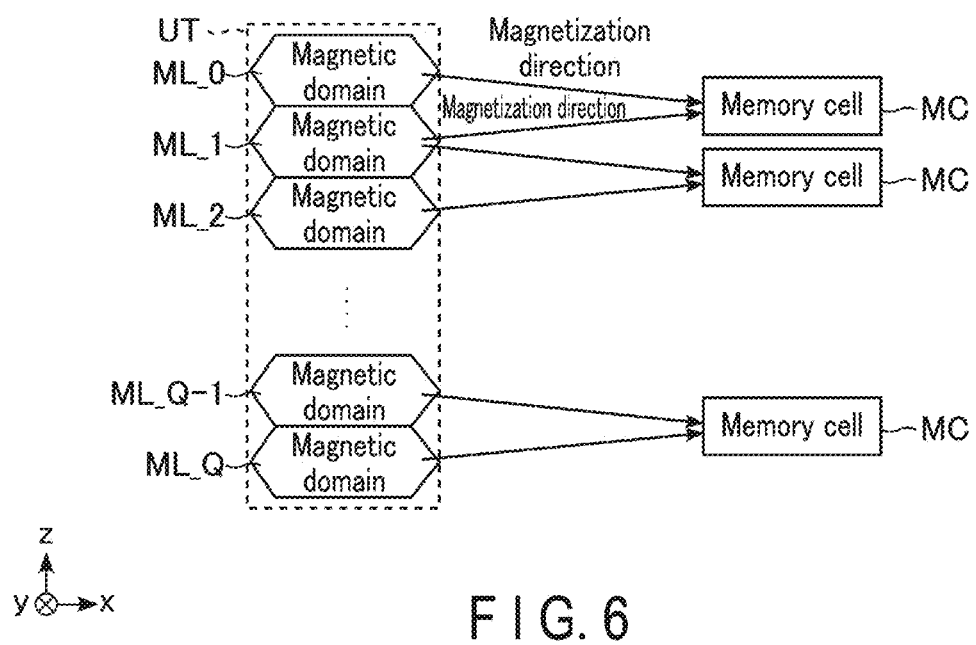
FIG. 6 shows a structure example of a magnetic body of the memory system according to the first embodiment.

FIG. 6 shows a structure example of each magnetic body UT of the memory system according to the first embodiment. Each of the magnetic bodies UT includes the plurality of unit portions ML as described with reference to FIG. 5. For example, each of the magnetic bodies UT includes Q+1 unit portions ML_0 to ML_Q. A boundary between each set of two adjacent unit portions ML has an xy area smaller than that in the other portions. The xy area is an area of the surface along the xy plane. Because of the xy area in each boundary between the unit portions ML being small, a domain wall is prone to remain in such a boundary between the unit portions ML as compared to the other positions. Based on a domain wall prone to remain in each boundary between the unit portions ML, a magnetic domain is formed in each of the unit portions ML. Each of the magnetic domains has a magnetization. The magnetization has one of two different directions. The direction of magnetization is variable through the control by the magnetic memory 2. To facilitate understanding, FIG. 6 shows a form in which each of the unit portions ML has a single magnetic domain. However, in the case where the direction of magnetization is the same between the two adjacent unit portions ML, a region formed by these unit portions ML has a single magnetic domain without a magnetic wall.

The magnetic memory 2 stores one-bit data according to the combination of magnetization directions of two adjacent unit portions ML. That is, two adjacent unit portions ML function as a single memory cell MC. One-bit data is stored based on whether the magnetization directions of two adjacent portions are parallel (or the same) or anti-parallel (or different).

1.1.5. Error Correction Circuit

Figure 7:
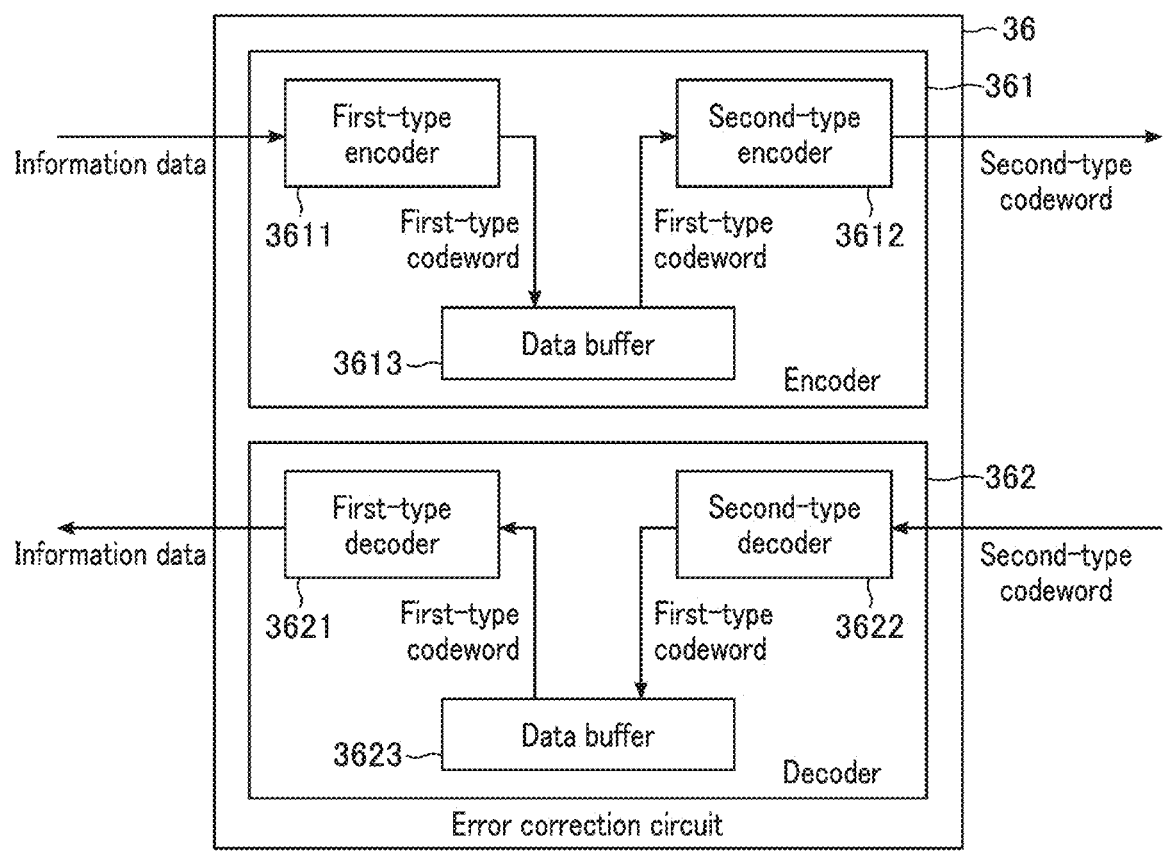
FIG. 7 shows functional blocks of an error correction circuit of the memory system according to the first embodiment.

FIG. 7 shows functional blocks of the error correction circuit of the memory system according to the first embodiment. As shown in FIG. 7, the error correction circuit 36 includes an encoder 361 and a decoder 362.

The encoder 361 includes a first-type encoder 3611, a second-type encoder 3612, and a data buffer 3613.

The first-type encoder 3611 performs encoding of the first type on data received by the first-type encoder 3611. The first-type encoder 3611 receives information data from a component other than the encoder 361 in the memory controller 3, for example, the RAM 33. The information data is data to be written into the magnetic memory 2, and includes data for which a write request transmitted from the host device 5 is targeted, and metadata. The write request target data is data (or, user data) which a user of the information processing system 100 desires to store in the memory system 1, and is data or a part of the data writing of which into the memory system 1 is requested by the host device 5. The metadata includes information on given user data, and is associated with the given user data. The first-type encoder 3611 performs the first-type encoding on received information data to generate a codeword of the received data, thereby outputting the generated codeword. A codeword generated by the first-type encoding includes a parity of a first-type error correction code (hereinafter also referred to as a "first-type error correction code parity") and hereinafter, it may be referred to as a first-type codeword. The first-type codeword is supplied to the data buffer 3613. In one example, the first-type encoder 3611 performs encoding using a RAM (not shown) in the first-type encoder 3611 and/or the RAM 33.

The first-type encoding is encoding using a generation method of the first-type error correction code parity, and it generates the first-type error correction code parity. The first-type error correction code parity is a parity of an error correction code, which includes a part of a codeword of a rank metric code. Rank metric codes are linear codes and are based on a rank distance, not the number of error bits, i.e., Hamming distance. That is, error correction using a rank metric code can correct a rank error of a number equal to or smaller than a certain rank distance. The rank metric codes will also be referred to as rank error correction codes. Examples of the rank metric codes include Gabidulin codes. The rank metric codes will be described later.

The second-type encoder 3612 performs encoding of the second type on data received by the second-type encoder 3612. The second-type encoder 3612 receives data from the data buffer 3613. Data to be received is the first-type codeword. The second-type encoder 3612 performs the second-type encoding on the received first-type codeword to generate a codeword of the received data, thereby outputting the generated codeword. A codeword generated by the second-type encoding includes a parity of a second-type error correction code (hereinafter also referred to as a "second-type error correction code parity") and hereinafter it may be referred to as a second-type codeword. The second-type codeword is transmitted directly to the memory interface 35, or is temporarily stored in the RAM 33 and then transmitted to the memory interface 35. The second-type codeword received by the memory interface 35 includes a part or the entirety of the write data, and is written into the magnetic memory 2. In one example, the second-type encoder 3612 performs encoding using a RAM (not shown) in the second-type encoder 3612 and/or the RAM 33.

The second-type encoding is encoding by a generation method of a codeword of the second-type error correction codes, and generates the second-type error correction code parity. The second-type error correction codes correct an error based on a Hamming distance. Examples of the second-type error correction codes include Bose-Chaudhuri-Hocquenghem (BCH) codes.

The decoder 362 includes a first-type decoder 3621, a second-type decoder 3622, and a data buffer 3623.

The second-type decoder 3622 performs decoding of the second type on data received by the second-type decoder 3622. The second-type decoder 3622 receives data from a component other than the decoder 362 in the memory controller 3, for example, the RAM 33 or the memory interface 35. Data to be received is read data transmitted from the magnetic memory 2 and is the second-type codeword. The second-type decoder 3622 performs the second-type decoding on the received second-type codeword to generate information data of the second-type codeword, thereby outputting the generated information data. The second-type decoding is decoding using the second-type error correction code, and generates information data of the second-type codeword. The generated information data is supplied to the data buffer 3623. In one example, the second-type encoder 3622 performs decoding using a RAM in the second-type decoder 3622 (not shown) and/or the RAM 33.

The first-type decoder 3621 performs decoding of the first type on data received by the first-type decoder 3621. The first-type decoder 3621 receives data from the data buffer 3623. Data to be received is the first-type codeword. The first-type decoder 3621 performs the first-type decoding on the received first-type codeword to generate information data of the first-type codeword, thereby outputting the generated information data. The generated information data includes at least a part of read request target data. The read request target data is data (or, user data) which a user of the information processing system 100 desires to read from the memory system 1, and is data or a part of the data that is requested to be read from the memory system 1 by the host device 5. The first-type decoding is decoding using the first-type error correction code, and generates information data of the first-type codeword. In one example, the first-type decoder 3621 performs decoding using a RAM (not shown) in the first-type decoder 3621 and/or the RAM 33.

1.2. Operation

Figure 8:
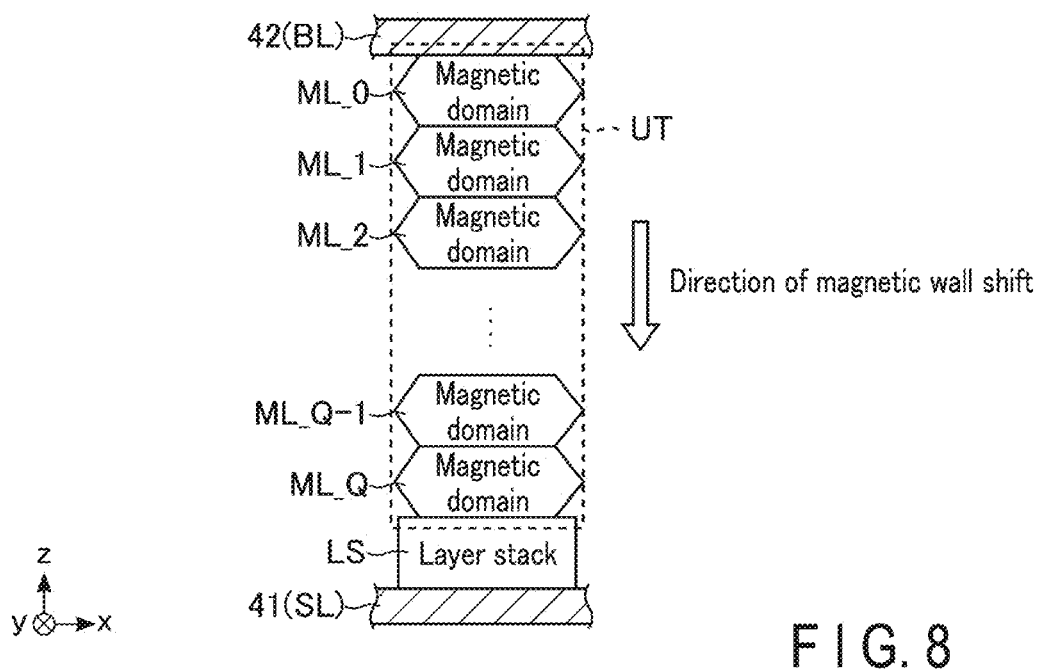
FIG. 8 shows a change during a certain operation in a part of the memory system according to the first embodiment.

FIG. 8 shows a change during a certain operation in a part of the memory system according to the first embodiment. Specifically, FIG. 8 shows a shift in domain walls for data reading and writing in the magnetic memory 2, and illustrates a single magnetic body UT and components associated with the aforementioned magnetic body UT.

One-bit data to be written into a certain magnetic body UT is written by providing the upper end of the aforementioned magnetic body UT, that is, the unit portion ML coupled to the conductor 42 with magnetization based on a value of data. When one-bit data is further written into the aforementioned magnetic body UT, all of the domain walls of the magnetic body UT are shifted toward the layer stack LS. All of the domain walls are shifted while maintaining a pattern of a sequence of magnetic domains, that is, a sequence of data of bits stored in the memory cells MC.

One-bit data in a certain memory cell MC is read while the upper unit portion ML having magnetization and providing a part of a function of data storage of the aforementioned memory cell MC is in contact with the lower end of the magnetic body UT, that is, the layer stack LS. For this purpose, at the time of data read, the upper unit portion ML that provides a part of the function of data storage of the memory cell MC storing therein the read target data is shifted to the lower end of the magnetic body UT. All of the domain walls are shifted while maintaining a pattern of a sequence of magnetic domains, that is, a sequence of data of bits stored in the memory cells MC.

As described above, in the magnetic memory 2, data write and read are performed in a form of first in, first out (FIFO) in a similar manner to a shift register.

Figure 9:
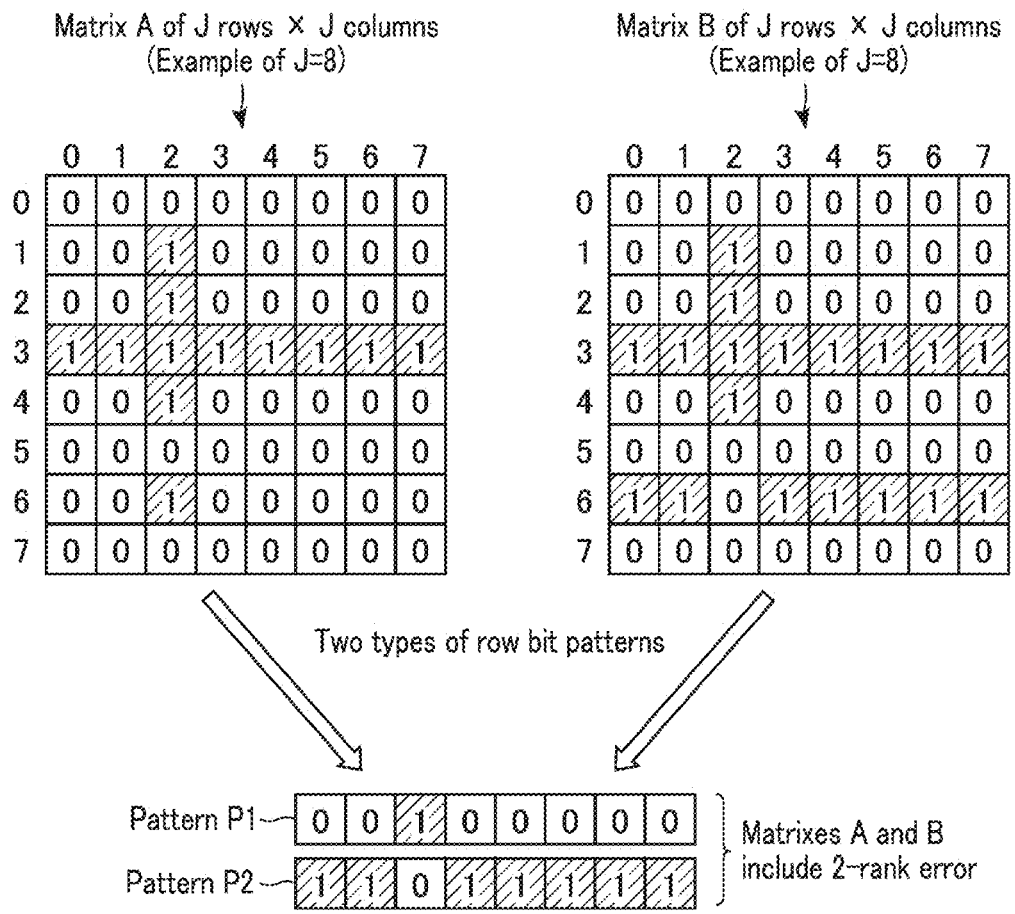
FIG. 9 conceptually shows a unit for use in generation of a codeword of an error correction code for use in the memory system according to the first embodiment.

FIG. 9 conceptually shows a unit for use in generation of a codeword of an error correction code for use in the memory system according to the first embodiment. Specifically, FIG. 9 shows ranks for use in the rank metric code.

As shown in FIG. 9, the rank metric code has an array in which N symbols of the Galois extension field GF ($q^M$) are arranged. N is equal to or smaller than M, and q is a power of a prime number. A rank metric code is considered to be elements of Gf (q) arranged in a matrix form of N rows×M columns. That is, FIG. 9 shows a rank metric code with M=J and N=J, as an example. A rank on GF($q^M$) is defined for the matrix. A rank of a difference between two codewords is defined as a rank distance of the two codewords. The minimum distance d in a rank metric is determined as the minimum value of the rank distance between all different codewords. Details will follow. The following is based on the example of q=2.

The rank metric code uses a set of one-bit data arranged in a two-dimensional matrix, and uses a unit called a rank. The rank metric code is formed as data arranged in a matrix of J rows×J columns, where J is an integer equal to or greater than 2. That is, each bit of the rank metric code is associated with a value (or coordinates or an index) indicating a position on the first dimension and a value (or coordinates) indicating a position on the second dimension, and is given an attribute indicating a value indicating the position on the first dimension and a value indicating the position on the second dimension. In the following, one of the two dimensions is associated with the rows of a two-dimensional matrix, and the other is associated with the columns of the two-dimensional matrix. That is, a value indicating a position in one dimension is associated with an index specifying a row, and a value indicating a position in the other dimension is associated with an index specifying a column.

Bits in hatched cells contain incorrect values. In the rank metric codes, the degree of error can be expressed by the number of patterns of error bits in the rows containing error bits.

The matrix A in the example shown in FIG. 9 includes a pattern P1 formed by a common sequence of bit values in the first, second, fourth, and sixth rows. The third row can be decomposed into two different patterns P1 and P2. Therefore, the distribution of bits containing errors in a matrix A can be expressed by two patterns P1 and P2. Based on this, the matrix A is evaluated to contain two patterns of erroneous bits, i.e., to contain a two-rank error. This two-rank error is different from a 12-bit error based on the number of error bits.

A matrix B has a distribution of error bits, which is significantly different from that of the matrix A. However, the distribution of erroneous bits in the matrix B can also be expressed by patterns P1 and P2. Based on this, the matrix B is also evaluated to contain a two-rank error.

Figure 10:
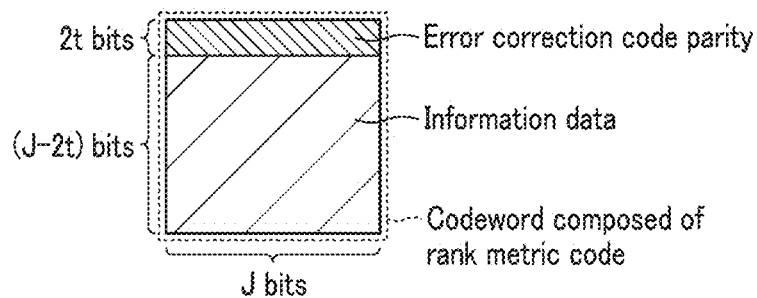
FIG. 10 shows some parameters of a codeword for use in the memory system according to the first embodiment.

FIG. 10 shows some parameters of a codeword for use in the memory system according to the first embodiment. In order to enable t-rank errors to be corrected using the rank metric code, where t is an integer equal to or greater than 1, it is necessary that the rank distance between two codewords that are different from each other be at least d=2t+1. That is, the required minimum rank distance is d. In order to ensure this distance, the codeword of the rank metric codes of J rows×J columns needs to include an error correction code parity of (d−1)×M bits. An example of a rank metric code including such an error correction code follows. That is, as shown in FIG. 10, the codeword of the rank metric codes of J rows×J columns, i.e., the first-type codeword, contains the error correction code parity of 2t rows×J columns in order to enable correction of a t-rank error. Therefore, the codeword of the rank metric codes includes information data on (J−2t) rows×J columns, that is, the code length of the information data is expressed by (J−2t)×J. Rank metric codes are described, for example, in Gabidulin, Ernst M. (1985) "Theory of codes with maximum rank distance", Problems of Information Transmission, 21 (1):1-12.

Figure 11:
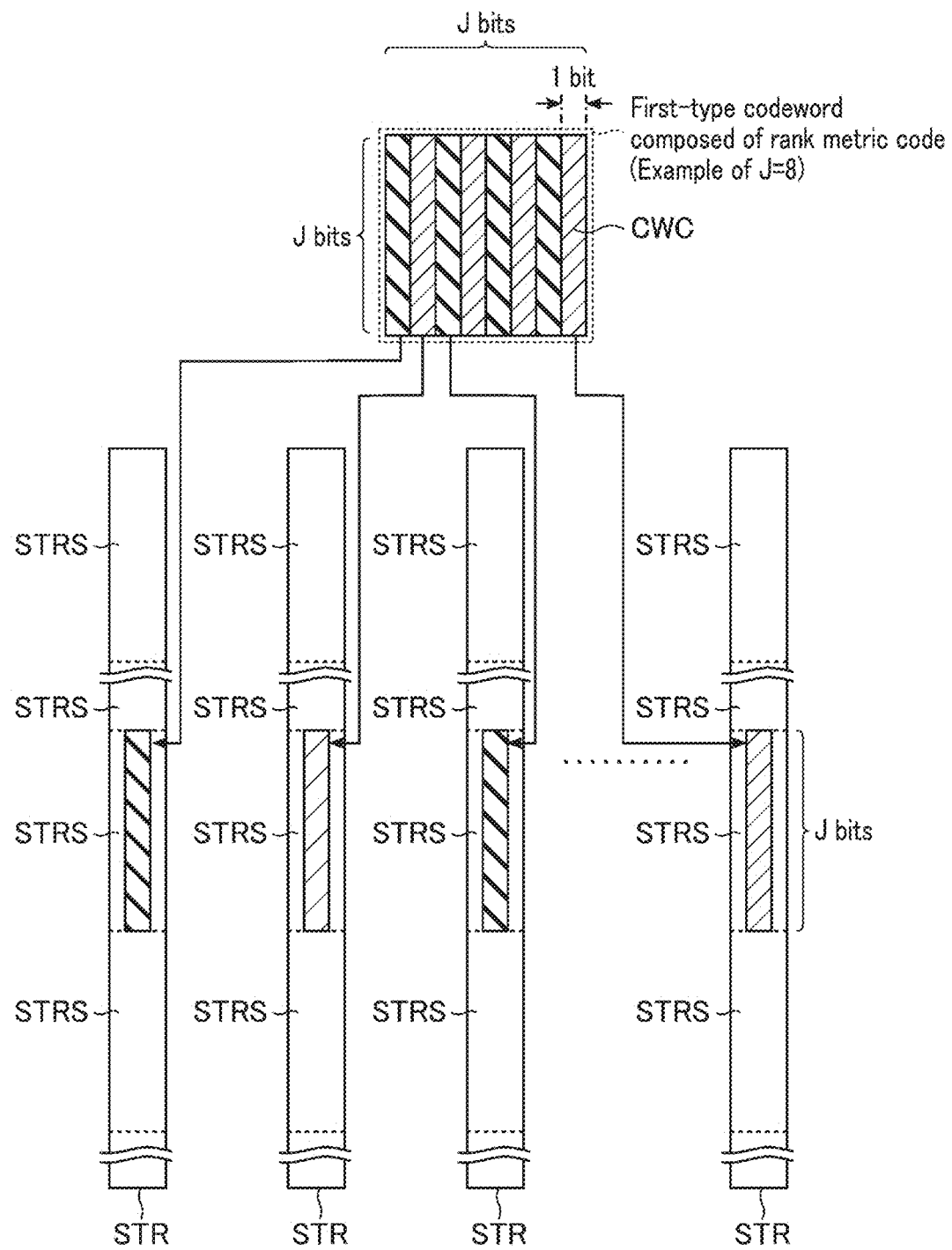
FIG. 11 shows an example of an area in which data is stored in the memory system according to the first embodiment.

FIG. 11 shows an example of an area in which data is stored in the memory system according to the first embodiment. As shown in FIG. 11, the codeword of the rank metric codes is stored in a certain area in the memory cell array 21 for each string of bits. Each column of the codeword of the rank metric codes, that is, each column of the first-type codeword may be referred to as a first-type codeword string section CWC. Each of the first-type code string sections CWC is stored in a part of a single string STR. A portion of each string STR, which stores one first-type code string section CWC, may be hereinafter referred to as a string section STRS. The string section STRS functions as a set of consecutive memory cells MC of J bits. The plurality of different first-type codeword string sections CWC of one first-type codeword are respectively stored one by one in the plurality of different strings STR.

Figure 12:
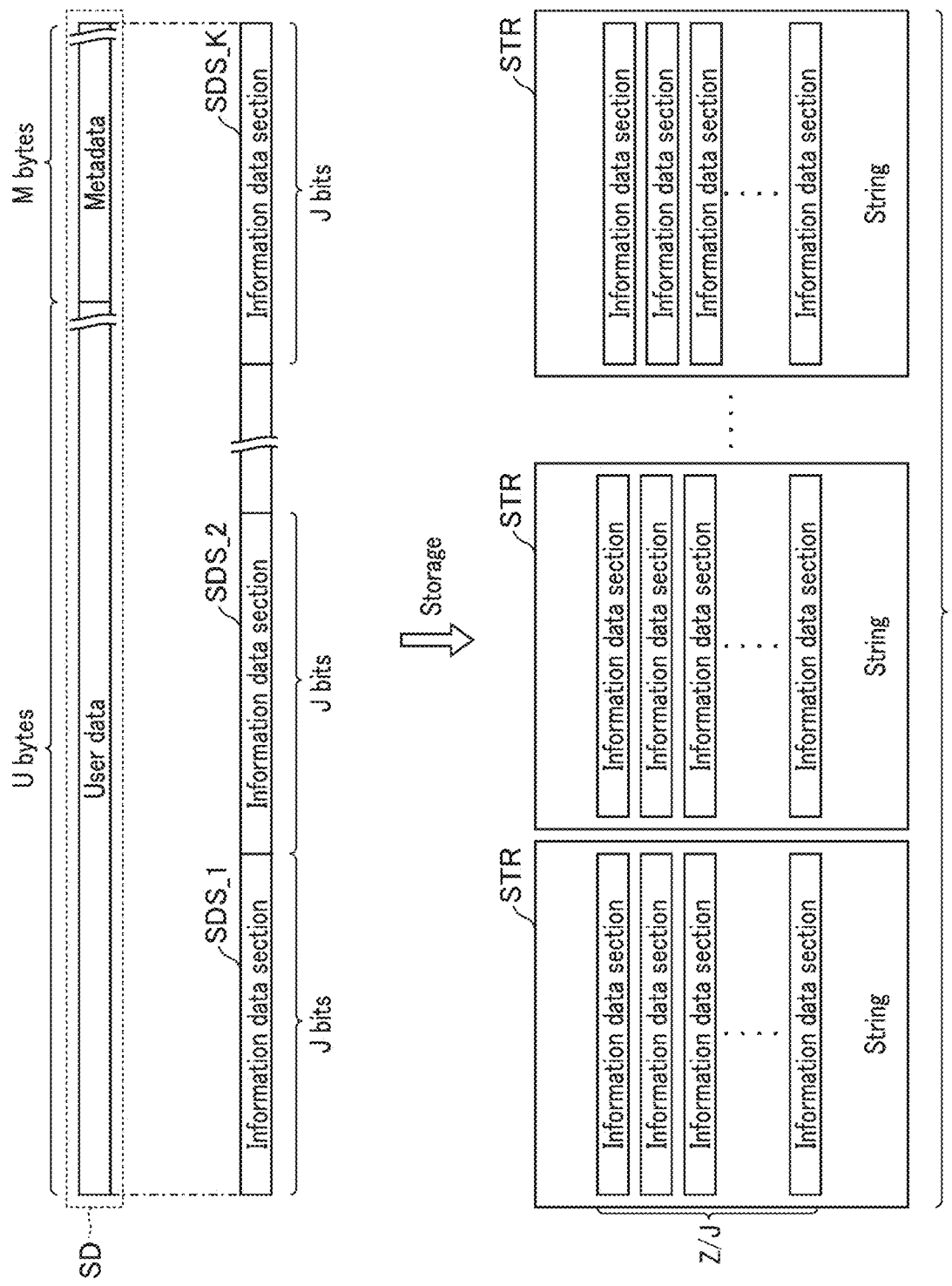
FIG. 12 conceptually shows division of information data for generation of a first-type codeword in the memory system according to the first embodiment.

FIG. 12 conceptually shows division of information data for generation of the first-type codeword in the memory system according to the first embodiment. FIG. 12 shows user data of one sector.

A value Z in the following refers to the number of bits used to store the first-type codeword, that is, the number of memory cells MC, in one string STR, and is an integer equal to or greater than 1. That is, as described above with reference to FIG. 7, the first-type codeword is subjected to second-type encoding to generate a second-type codeword. One second-type codeword is written into one string STR. Thus, in the Q bits in one string STR, the first-type codeword is stored in the Z bits and the second-type error correction code parity is stored in the (Q-Z) bits.

A value F in the following refers to the number of strings STR in which user data of one sector is written, and is an integer equal to or greater than 1.

FIG. 12 and the description relating to FIG. 12 are based on an example of a method of enabling correction of a one-rank error, that is, an example of t=1. Therefore, each of the first-type codewords includes the first-type error correction code parity of two rows. The case where t exceeds 1 can be understood by a person skilled in the art by changing 1 and a value based on t=1 in the following descriptive portions in which 1 is used as a specific example of t.

User data is divided into a plurality of sections in order to generate the first-type codeword of J rows×J columns, and the first-type codeword is generated using the sections. As described above with reference to FIG. 11, each first-type codeword string section CWC is written into one string section STRS. However, all of the user data may not be divisible by J bits based on the respective sizes of one sector, t, and J. In such a case, a target for which the first-type codeword is generated can be resized such that the size of the set of first-type codeword string sections CWC of each set of generated first-type codewords becomes equal to a multiple of J bits. Examples of resizing include generating information data SD including user data of U bytes and metadata of M bytes. Hereinafter, in the information data SD, multiple portions of the same size may be referred to as information data sections SDS. M is determined such that the first-type codeword string section CWC of the information data section SDS in the information data SD including U-byte user data and M-byte metadata has J bits. That is, M is determined such that $(U+M) \times 8 \times (J/(J-2t))$ becomes equal to J or a multiple of J. Examples of metadata include cyclic redundancy check (CRC) codes.

K string sections STRS are required for the information data sections SDS in information data SD of (U+M) bytes to be written into the string sections STRS of J bits. K is expressed by $(U+M) \times 8 \times (J/(J-2t))/J$, and is an integer equal to or greater than 1.

For storage in the K string sections STRS, F strings STR are required based on Z (that is, the number of bits storing the first-type codeword in one string STR). That is, Z×F=K. Thus, M (that is, the size of metadata) and F (that is, the number of strings STR) used for storing the first-type codeword of user data of one sector are determined.

Each set of Z/J information data sections SDS is stored in one string STR out of the F strings.

Figure 13:
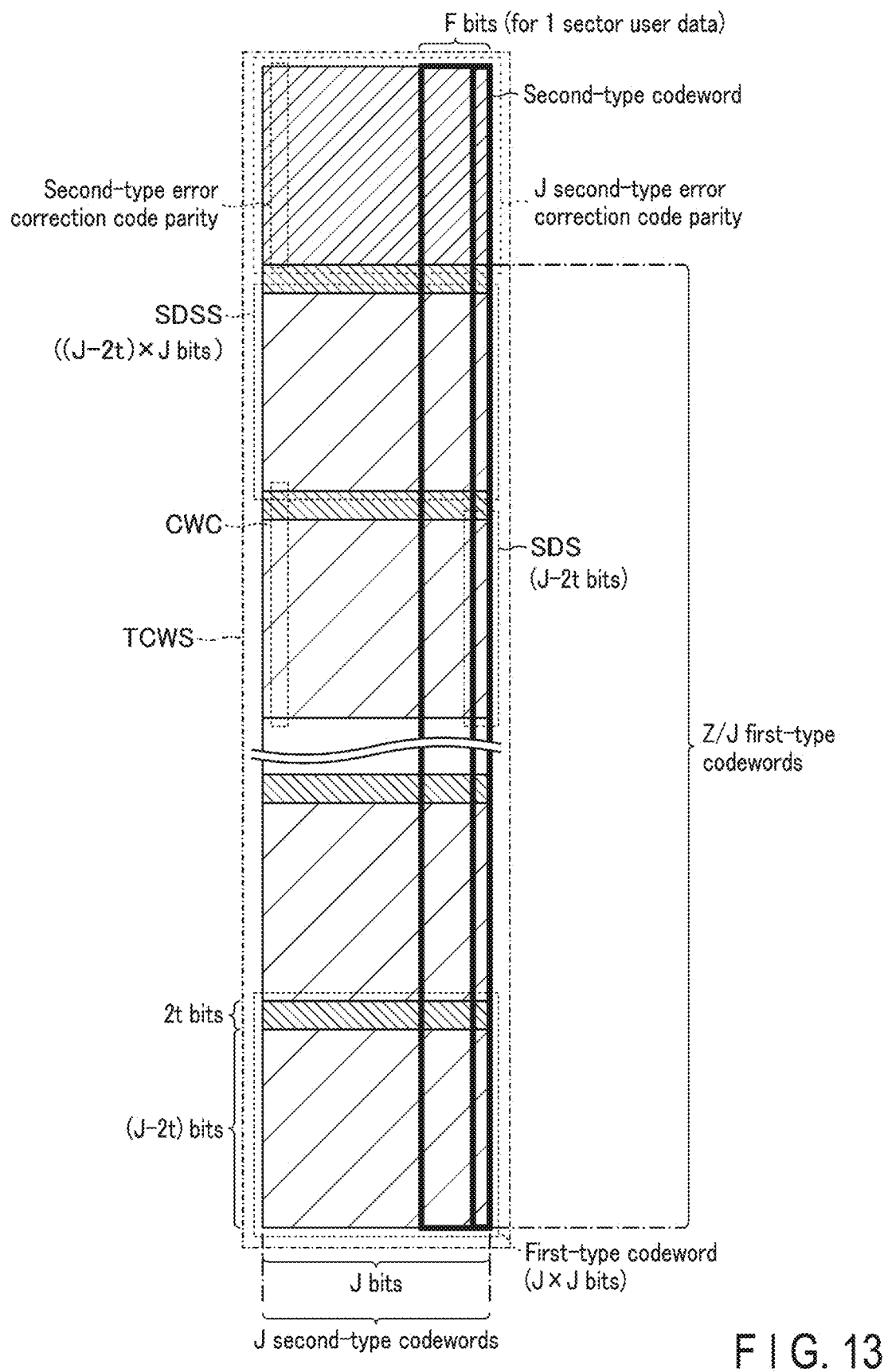
FIG. 13 conceptually shows an operation on data for storage of user data in the memory system according to the first embodiment.

Next, writing of user data into the magnetic memory will be described with reference to FIG. 13. FIG. 13 conceptually shows an operation on data for storage of user data in the memory system according to the first embodiment.

As described above with reference to FIG. 12, the memory controller 3 generates metadata of M bytes for writing of one sector, i.e., user data of U bytes, to generate information data SD of (U+M) bytes.

As shown in FIG. 13, the memory controller 3 divides the information data SD into information data sections SDS with a size of J bits. This division results in K information data sections SDS.

As described above with reference to FIG. 12, user data of one sector is written into F strings STR. Based on this, for generation of the first-type codeword having a size of J bits in the column, processing for generation of K information data section SDS is performed on each of the J/F user data.

The memory controller 3 performs the first-type encoding on each set of J information data sections SDS among the J/F user data using the first-type encoder 3611. Hereinafter, a set of J information data sections SDS on which the first-type encoding is performed may be referred to as an "information data section set SDSS". The information data section set SDSS has an information length of (J−2t)×J bits. As a result of the first-type encoding, one first-type codeword is generated. The first-type codeword has a size of J×J bits.

Similarly, the memory controller 3 uses the first-type encoder 3611 to generate the first-type codewords from all remaining information data section sets SDSS. As a result, Z/J first-type codewords are obtained.

The memory controller 3 uses the second-type encoder 3612 to generate the plurality of second-type error correction code parities from a set of Z/J first-type codewords. That is, the second-type encoder 3612 performs the second-type encoding on a portion to be written into one string STR in a set of the first-type codewords, that is, a set of the plurality of first-type codeword string sections CWC to be written into one string STR in the set of the first-type codewords. The second-type encoding using the set of the first-type codeword string sections CWC generates a second-type codeword including the aforementioned set of the first-type codeword string sections CWS and the second-type error correction code parity.

Similarly, the memory controller 3 uses the second-type encoder 3612 to generate a plurality of second-type codewords that include respective sets among all remaining first-type codeword string sections CWC in the set of first-type codewords. By this, J second-type codewords are obtained. J second-type codewords include a set of J second-type error correction code parities. The memory controller 3 uses J second-type codewords thus obtained as write data, thereby writing it into the magnetic memory 2. Each second-type codeword is written into one string STR.

Figure 14:
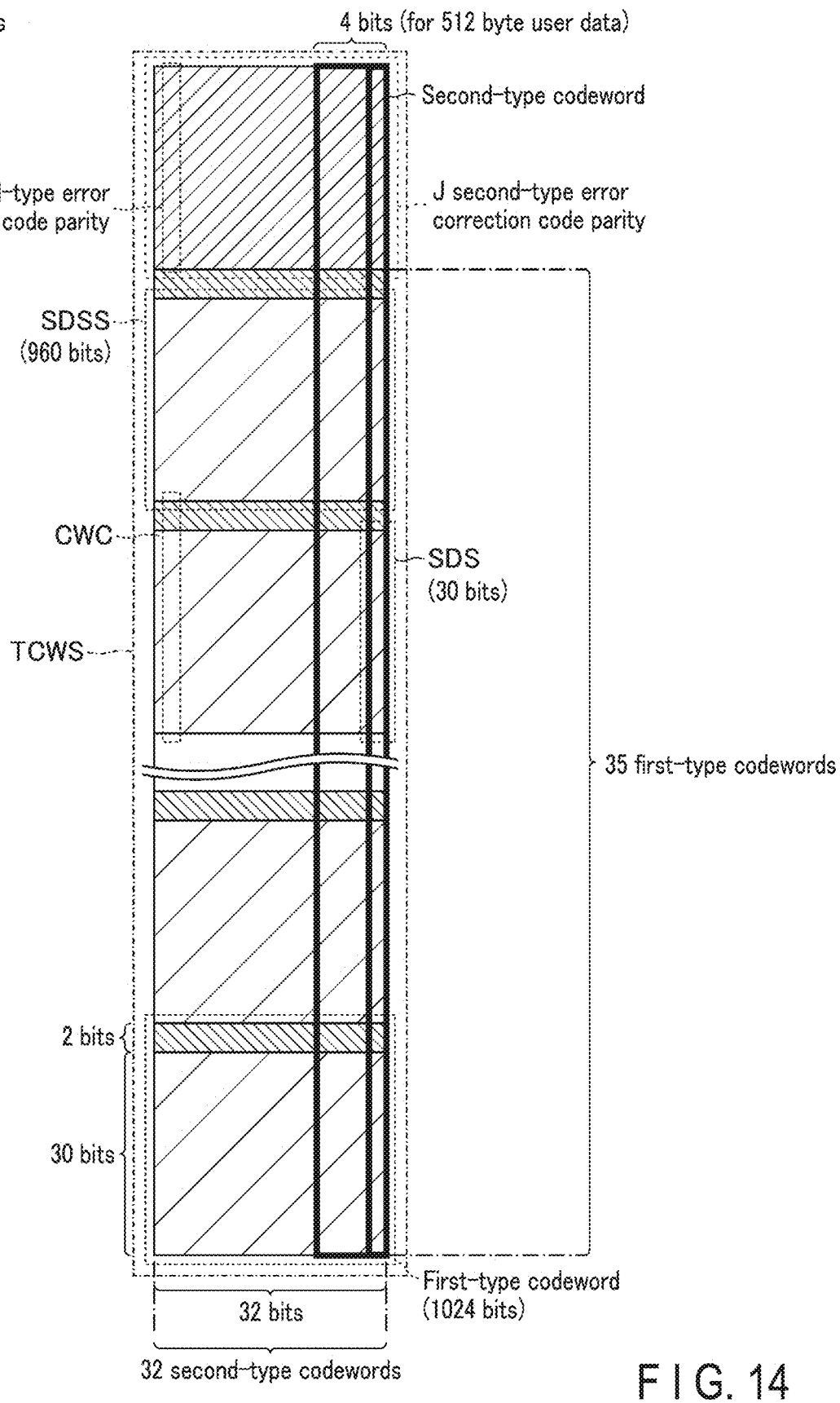
FIG. 14 shows a first example of data generated through encoding in the memory system according to the first embodiment.
Figure 15:
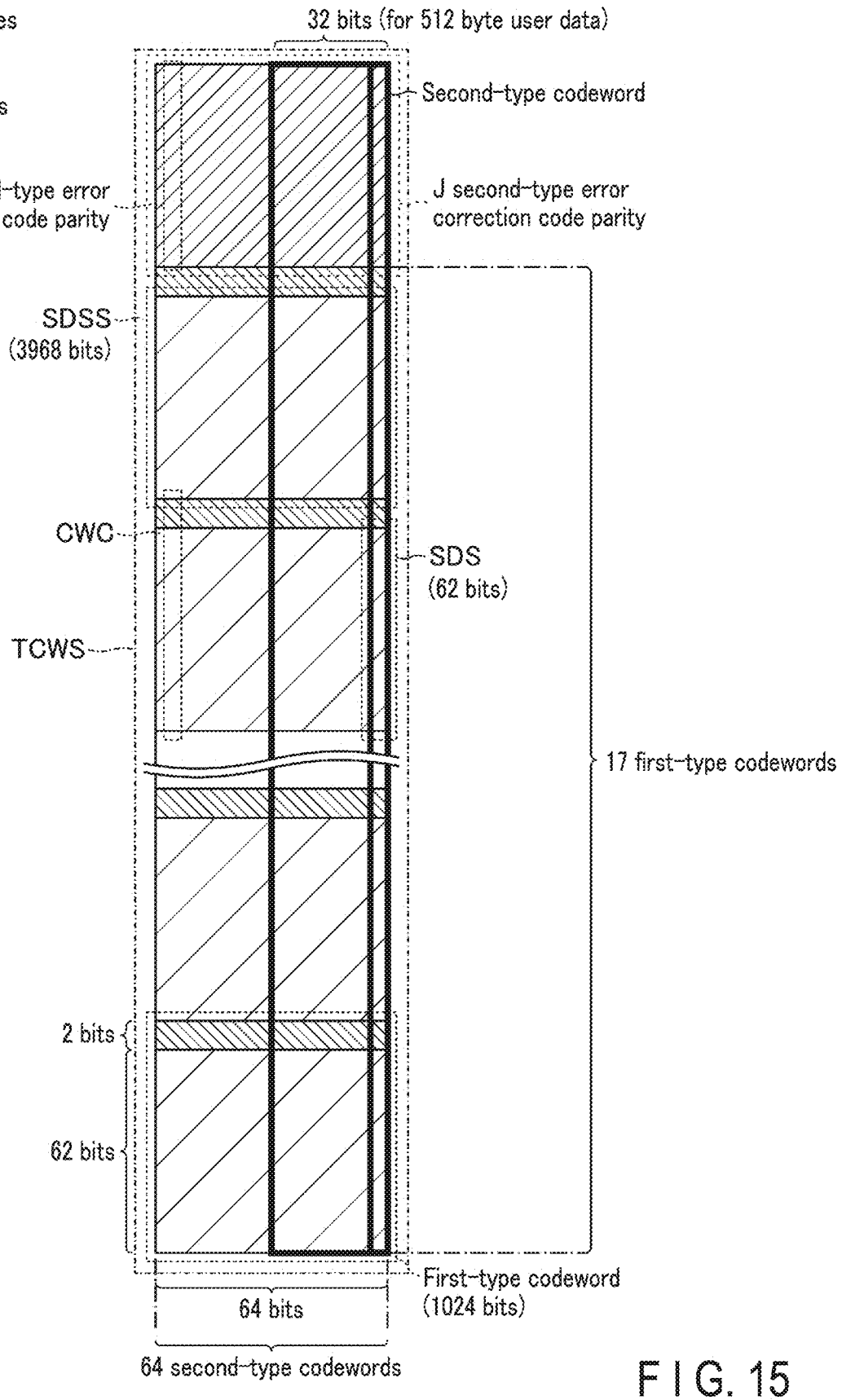
FIG. 15 shows a second example of data generated through encoding in the memory system according to the first embodiment.
Figure 16:
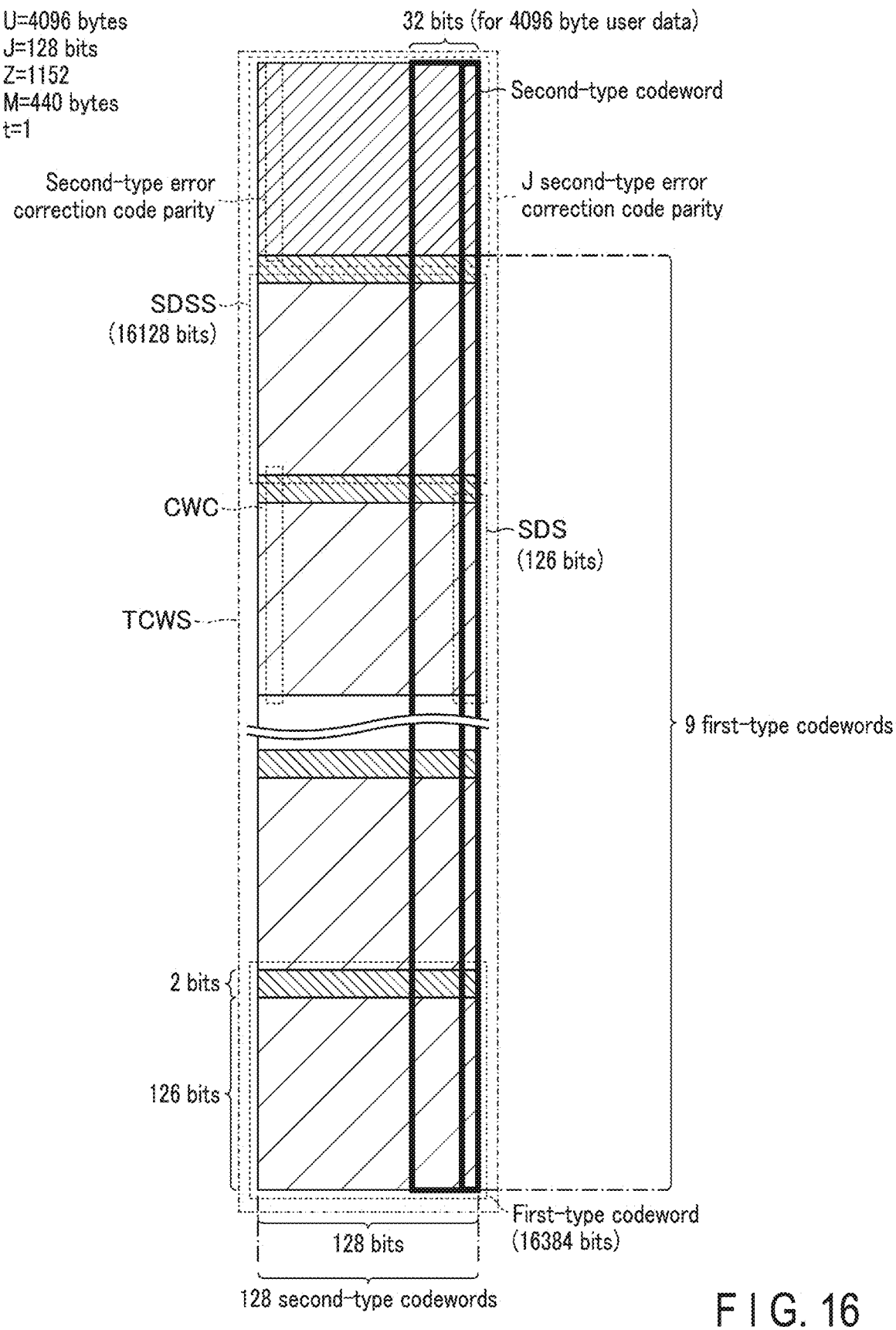
FIG. 16 shows an example of data generated through encoding in the memory system according to the first embodiment.

FIG. 14, FIG. 15, and FIG. 16 illustrate examples of data generated through an encoding by the memory system according to the first embodiment. FIG. 14, FIG. 15, and FIG. 16 illustrate various cases of U, J, and Z. FIG. 14, FIG. 15, and FIG. 16 illustrate the first, second, and third cases, respectively.

FIG. 14 shows an example in which U is 512, J is 32, and Z is 1120. Z is a multiple of J. As shown in FIG. 14, based on U being 512, M is 13, i.e., metadata of 13 bytes is used in one example. Therefore, the information data SD including user data of one sector has a size of 525 bytes. The above example is not a limitation and it suffices that M satisfies the conditions described above with reference to FIG. 12, and that based on the example of U equal to 512, J equal to 32, and t equal to 1, M is a number that enables the product of (512+M)×8 be divisible by 30 (=J−2t), that is, a value that sets $(512+M) \times 8/30$ to an integer. The smallest M described above is 13, and it suffices that M is equal to 13+15n, where n is a positive integer.

The number of string sections STRS required for the first-type codeword with a size generatable from the information data SD of 525 bytes to be written into the string section STRS of 32 bits is expressed as $$K = 525 \times 8 \times (32/(32-2t)) = 4480.$$

Since Z is equal to 1120, F=4480/1120=4. That is, four strings STR are required to store the first-type codewords of user data of one sector. F may be predetermined, and Z may be determined based on F.

Based on four strings STR being required to store one piece of user data, eight pieces of user data are required to generate the first-type codewords. The value of 8 is based on $J/F = 32/4$.

The specific generation of a set of the second-type codewords from user data is as follows. That is, eight pieces of user data are collected. By adding metadata of 13 bytes to each of the eight pieces of user data of 512 bytes, eight pieces of information data of 525 bytes are generated. The set of eight pieces of information data SD is divided into 4480 information data sections SDS. The information data section sets SDSS are formed from a total of 32 information data sections SDS in the set of eight pieces of information data SD. Since Z is equal to 1120, 35 information data section sets SDSS are formed. The value of 35 is based on 1120/32. Each information data section set SDSS has a size of 960 bits. The value of 960 is based on 32×30.

The first-type encoding is performed on each information data section set SDSS, resulting in generation of 35 first-type codewords. Each of the first-type codewords includes the first-type error correction code parity with a size of 2 bits×32 bits (=64 bits), and has a size of 32 bits×32 bits (=1024 bits).

Thirty-five first-type codewords are divided into sets of a total of 35 first-type codeword string sections CWC each of which is from one of the 35 first-type codewords. This results in obtainment of 32 sets of first-type codeword string sections CWC. The second-type encoding is performed on each of the 32 sets of the first-type codeword string sections CWC. This results in generation of 32 second-type codewords. Hereinafter, J (=32) second-type codewords thus obtained may be referred to as a "second-type codeword set TCWS". Thirty-two second-type codewords are written into 32 strings STR, respectively.

FIG. 15 shows an example in which U is equal to 4096 (that is, the size of one sector is 4 Kbytes), J is equal to 64, and Z is equal to 1088. As shown in FIG. 15, based on U being 4096, M is 120 bytes in one example. Therefore, the information data including user data of one sector has a size of 4216 bytes. Based on the example of U equal to 4096, J equal to 64, and t equal to 1, it suffices that M is a number that enables the product of (4096+M)×8 to be divisible by 62 (=J−2t), that is, a value that sets (4096+M)×8/62 to an integer.

The number of string sections STRS required for the first-type codeword with a size generable from the information data SD of 4216 bytes to be written into the string section STRS of 64 bits is expressed as $$K = 4216 \times 8 \times (64/(64 - 2t)) = 34816.$$

Since Z is equal to 1088, F=34816/1088=32. That is, 32 strings are required to store the first-type codewords of user data of one sector.

Based on 32 strings STR being required to store one piece of user data, two pieces of user data are required to generate the first-type codewords. The value of 2 is based on J/F=64/32.

The specific generation of a set of the second-type codewords from user data is as follows. That is, two pieces of user data are collected. By adding metadata of 120 bytes to each of the two pieces of user data of 4096 bytes, two pieces of information data of 4216 bytes are generated. The set of two pieces of information data SD is divided into 34816 information data sections SDS. The information data section sets SDSS are formed from a total of 64 information data sections SDS in the set of two pieces of information data SD. Since Z is equal to 1088, 17 information data section sets SDSS are formed. The value of 17 is based on 1088/64. Each information data section set SDSS has a size of 3968 bits. The value of 3968 is based on 64×62.

The first-type encoding is performed on each information data section set SDSS, resulting in generation of 17 first-type codewords. Each of the first-type codewords includes the first-type error correction code parity with a size of 2 bits×64 bits (=128 bits), and has a size of 64 bits×64 bits (=4096 bits).

The set of 17 first-type codewords is divided into sets of a total of 17 first-type codeword string sections CWC each of which is from one of the 17 first-type codewords. This results in obtainment of 64 sets of first-type codeword string sections CWC. The second-type encoding is performed on each of the 64 sets of the first-type codeword string sections CWC. This results in generation of 64 second-type codewords. Sixty-four second-type codewords are written into 64 strings STR, respectively.

FIG. 16 shows an example in which U is equal to 4096, J is equal to 128, and Z is equal to 1152. As shown in FIG. 16, based on U being 4096, M is 440 in one example. Therefore, the information data including user data of one sector has a size of 4536 bytes. Based on the example of U equal to 4096, J equal to 128, and t equal to 1, it suffices that M is a number that enables the product of (4096+M)×8 to be divisible by 126 (=J−2t), that is, a value that sets (4096+M)×8/126 to an integer.

The number of string sections STRS required for the first-type codeword of a size generatable from the information data SD of 4536 bytes to be written into the string section STRS of 128 bits is expressed as $$K = 4536 \times 8 \times (128/(128 - 2t)) = 36864.$$

Since Z is equal to 1152, F=36864/1152=32. That is, 32 strings are required to store the first-type codewords of user data of one sector.

Based on 32 strings STR being required to store one piece of user data, four pieces of user data are required to generate the first-type codewords. The value of 4 is based on J/F=128/32.

The specific generation of a set of the second-type codewords from user data is as follows. That is, four pieces of user data are collected. By adding metadata of 440 bytes to each of the four pieces of user data of 4096 bytes, four pieces of information data of 4536 bytes are generated. The set of four pieces of information data SD is divided into 36864 information data sections SDS. The information data section sets SDSS are formed from a total of 128 information data sections SDS in four pieces of information data SD. Since Z is equal to 1152, 9 information data section sets SDSS are formed. The value of 9 is based on 1152/128. Each information data section set SDSS has a size of 16128 bits. The value of 16128 is based on 128×126.

The first-type encoding is performed on each information data section set SDSS, resulting in generation of 9 first-type codewords. Each of the first-type codewords includes the first-type error correction code parity with a size of 2 bits×128 bits (=256 bits), and has a size of 128 bits×128 bits (=16384).

The set of nine first-type codewords is divided into sets of a total of 9 first-type codeword string sections CWC each of which is from one of the nine first-type codewords. This results in obtainment of 128 sets of first-type codeword string sections CWC. The second-type encoding is performed on each of the 128 sets of the first-type codeword string sections CWC. This results in generation of 128 second-type codewords. One hundred twenty-eight second-type codewords are written into 128 strings STR, respectively.

Figure 17:
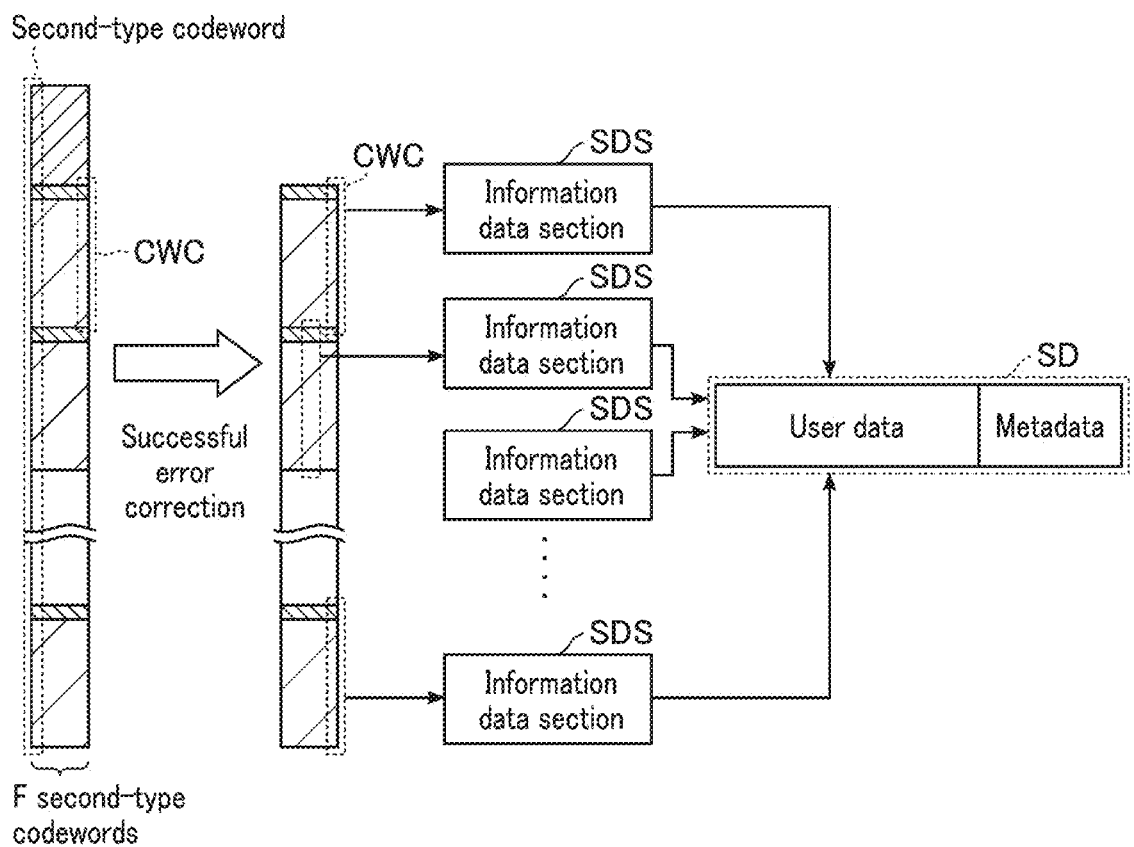
FIG. 17 shows an example of data generated through decoding in the memory system according to the first embodiment.
Figure 18:
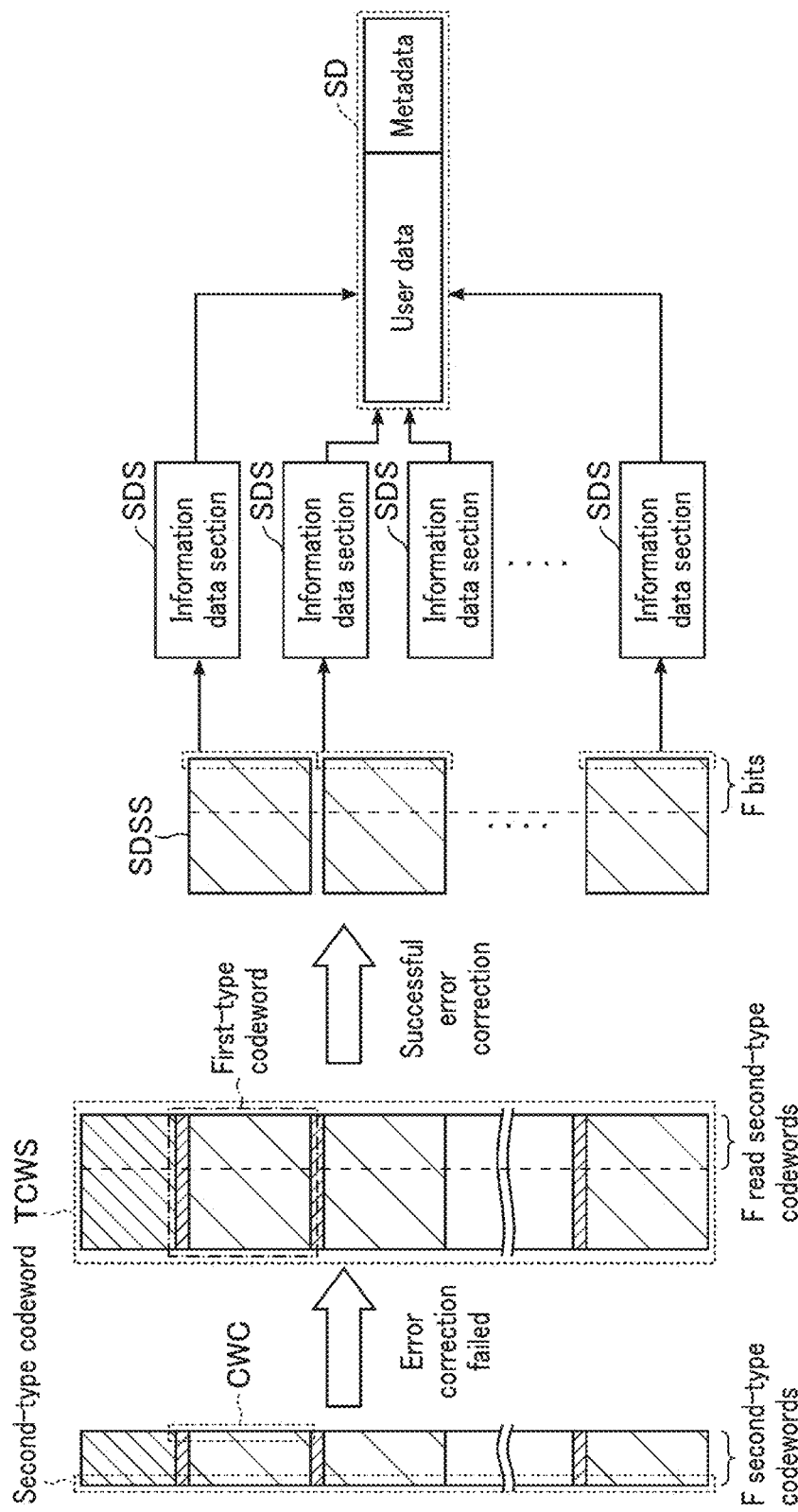
FIG. 18 shows an example of data generated through decoding in the memory system according to the first embodiment.

FIG. 17 and FIG. 18 show examples of data generated through decoding in the memory system according to the first embodiment. An outline of decoding is equivalent to the processing in the reverse order of the series of processing performed in encoding. FIG. 17 shows a successful case of error correction using the second-type codeword. FIG. 18 shows a failure case of error correction using the second-type codeword fails.

As shown in FIG. 17, in response to a request for a read of user data of a certain sector from the host device 5, the memory controller 3 reads all F second-type codewords including the user data from the magnetic memory 2. Each second-type codeword includes the plurality of first-type codeword string sections CWC and the second-type error correction code parity, as described above with reference to FIG. 13. Each of the first-type codeword string sections CWC includes the information data section SDS of the information data SD including user data, as described above with reference to FIG. 11 and FIG. 12, and a portion of the first-type codeword in the first-type codeword including the aforementioned first-type codeword sequence section CWC.

The memory controller 3 decodes each second-type codeword. That is, the memory controller 3 corrects an error using the second-type error correction code parity of each second-type codeword in the case where the plurality of first-type codeword string sections CWC included in the aforementioned second-type codeword contain an error. In the case where the error correction is successful, a set of first-type codeword string sections CWC including no errors is obtained. The obtained set of first-type codeword string sections CWC is user data is a read request target and including no errors.

As shown in FIG. 18, if error correction fails in any one of the second-type codewords, the memory controller 3 reads, from the magnetic memory 2, the remaining J-F second-type codewords in the second-type codeword set TCWS including the second-type codeword for which error correction has failed. This results in obtainment of the second-type codeword set TCWS and in turn, the plurality of first-type codewords including user data which is a read request target.

The memory controller 3 decodes the plurality of first-type codewords. That is, the memory controller 3 corrects an error using the first-type error correction code parity of each first-type codeword in the case where the aforementioned first-type codeword contains an error. As a result of decoding, the plurality of information data section sets SDSS including no errors are obtained. The set of information data section sets SDSS includes, in a portion included in F second-type codewords read first, information data that includes read request target user data and no errors, that is, read request user data without an error. By this, read request target user data including no errors is obtained.

FIG. 19 shows a flow of a certain operation in the memory system according to the first embodiment. Specifically, FIG. 19 shows a flow of encoding of user data targeted for a write request from the host device 5. The flow shown in FIG. 19 is started when the memory system 1 receives a write request and user data targeted for the write request from the host device 5.

The memory controller 3 generates an information data section from the user data (ST1). That is, the memory controller 3 generates information data SD from user data and metadata, and divides the generated information data SD into a plurality of information data sections SDS.

The memory controller 3 determines whether or not an information data section has been generated from each piece of user data in the same manner as in step ST1 for all of the J/F pieces of user data (ST2).

In the case where information data sections SDS have not been generated (ST2_No) for each of the J/F pieces of user data, the memory controller 3 selects the next user data that has not yet been targeted for division into information data sections SDS (ST3). Step ST3 continues to step ST1. That is, the memory controller 3 generates information data SD including the selected user data, and divides the generated information data SD into information data sections SDS.

In the case where information data sections SDS have been generated for each of the J/F pieces of user data (ST2_Yes), the memory controller 3 performs a first-type encoding for one information data section set SDSS using the first-type encoder 3611 (ST4). By this, one first-type codeword is obtained.

In the case where the first-type encoding has not been performed for each of the Z/J information data section sets SDSS (ST6_No), the memory controller 3 selects the next information data section set SDSS that has not yet been targeted for the first-type encoding (ST7). Step ST7 continues to step ST4. That is, the memory controller 3 performs the first-type encoding on the selected information data section set SDSS.

The memory controller 3 determines, for all of the Z/J information data section sets SDSS (ST6), whether or not the first-type encoding has been performed on each information data section set SDSS.

In the case where the first-type encoding has been performed for each of the Z/J information data section sets SDSS (ST6_Yes), the memory controller 3 uses the second-type encoder 3612 to perform the second-type encoding on a set of first-type codeword string sections CWC to be written into one string STR (ST8).

The memory controller 3 determines, for all sets of the J first-type codeword string sections CWC, whether or not the second-type encoding has been performed on each set of the first-type codeword string sections CWC (ST9).

In the case where the second-type encoding has not been performed on each of the sets of the J first-type codeword string sections CWC (ST9_No), the memory controller 3 selects the next set of first-type codeword string sections CWC, which has not yet been targeted for the second-type encoding (ST10). Step ST10 continues to step ST8. That is, the memory controller 3 performs the second-type encoding on the selected set of first-type codeword string sections CWC.

In the case where the second-type encoding has been performed on each of the J first-type codeword string sections CWC (ST8 No), the flow is ended. By the end of the flow, one second-type codeword set TCWS is obtained.

FIG. 20 shows a flow of a certain operation in the memory system according to the first embodiment. Specifically, FIG. 20 shows a flow of a decoding of user data targeted for a read request from the host device 5. The flow of FIG. 20 is started when the memory system 1 receives a read request from the host device 5.

The memory controller 3 reads F second-type codewords including user data from the magnetic memory 2 (ST11).

The memory controller 3 performs the second-type decoding on one of the F second-type codewords using the second-type decoder 3622 (ST12).

In the case where the second-type decoding is successful (ST13_Yes), the memory controller 3 determines, for all of the F second-type codewords, whether or not the second-type decoding on each of the F second-type codewords is successful (ST14).

In the case where the second-type decoding for each of the F second-type codewords is not successful (ST14_No), the memory controller 3 selects the next second-type codeword that has not yet been targeted for the second-type decoding (ST15). Step ST15 continues to step ST12. That is, the memory controller 3 performs the second-type decoding on the selected second-type codeword.

In the case where the second-type decoding for each of the F second-type codewords is successful (ST14_Yes), the flow is ended. In this case, a set of first-type codeword string sections CWC, which includes no errors, that is, read request target user data including no errors, is obtained.

In the case where the second-type decoding fails (ST13_No), the memory controller 3 reads the remaining second-type codewords from the magnetic memory 2 in order to obtain a second-type codeword set TCWS including F second-type codewords (ST21). As a result of step ST21, the second-type codeword set TCWS containing user data targeted for the read request is obtained.

The memory controller 3 decodes the second-type codeword that has not been decoded within the second-type codeword set TCWS (ST22) by using the second-type decoder 3622. That is, the memory controller 3 performs the second-type decoding on the second-type codeword that has not been decoded from among the second-type codewords read in step ST11 and on the second-type codeword read out in step ST21.

The memory controller 3 performs the first-type decoding on one first-type codeword in the second-type codeword set TCWS (ST23).

In the case where the first-type decoding fails (ST24_No), the flow is ended. In this case, a read of user data targeted for a read request target is a failure, and the user data cannot be obtained.

In the case where the first-type decoding is successful (ST24_Yes), the memory controller 3 determines whether or not the first-type decoding is successful for all, i.e., Z/J first-type codewords in the second-type code set TCWS (ST25).

In the case where the first-type decoding for z/J first-type codewords in the second-type codeword set TCWS is successful (ST25_Yes), Z/J information data section sets SDSS are obtained. The Z/J information data section sets SDSS include a section of read request target user data including no errors. Thus, the memory controller 3 generates read request target user data including no errors from the obtained Z/J information data section sets SDSS, and the flow is ended.

In the case where the first-type decoding for all of the first-type codewords, that is, for the Z/J first-type codewords in the second-type codeword set TCWS is not successful (ST25_No), the memory controller 3 selects the first-type codeword that has not yet been targeted for the first-type decoding (ST26). Step ST26 continues to step ST23. That is, the memory controller 3 performs the first-type decoding on the selected first-type codeword.

1.3. Advantages (Advantageous Effects)

According to the first embodiment, a memory system that is highly resistant to data errors can be provided, as described below.

Figure 21:
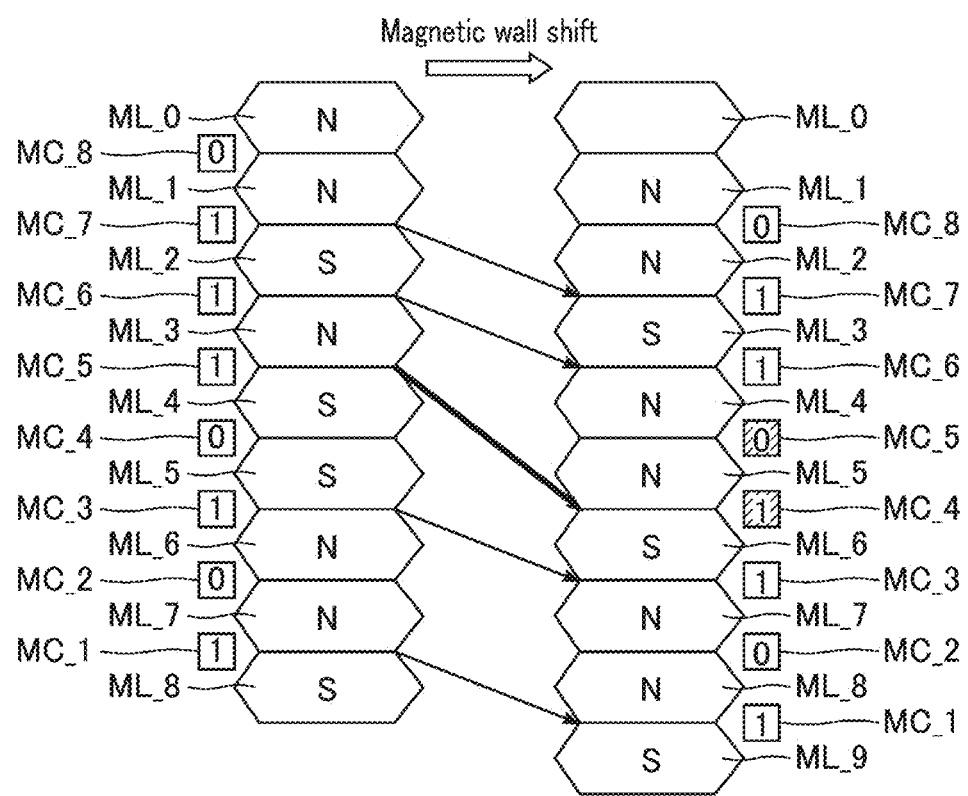
FIG. 21 shows a first pattern of an unintended domain wall shift in a magnetic memory.

A FIFO type magnetic memory such as the magnetic memory 2 may cause the following two patterns of unintentional magnetic shift. FIG. 21 and FIG. 22 show a first pattern and a second pattern of magnetic wall shift different from those intended in the magnetic memory, respectively. Each of the shifts shown in FIG. 21 and FIG. 22 is intended to shift every one of all of the magnetic walls by one bit, that is, from a boundary of a unit portion ML where each magnetic wall is positioned before the shift to its adjacent boundary. Therefore, after the shift, the magnetic memory 2 recognizes that the memory cell MC_$\beta$ based on the unit portion ML_$\alpha$ and the unit portion ML_$\alpha$+1 is based on the unit portion ML_$\alpha$+1 and the unit portion ML_$\alpha$+2 after the shift, where $\alpha$ and $\beta$ are positive integers.

As shown in FIG. 21, in the first pattern, a certain magnetic wall shifts to an unintended position. That is, the magnetic wall positioned between the unit portions ML_3 and ML_4 before the shift has shifted beyond the intended boundary between the unit portions ML_4 and ML_5 up to the boundary between the unit portions ML_5 and ML_6. Before the shift, the memory cell MC_5 stores "1" data by the unit portions ML_3 and ML_4, and the memory cell MC_6 stores "0" data by the unit portions ML_4 and ML_5. However, as a result of the unintentional shift of the magnetic wall, the memory cell MC_5 stores "0" data by the unit portions ML_4 and ML_5, and the memory cell MC_4 stores "1" data by the unit portions ML_5 and ML_6. This means that due to the shift, the string of bits shown in FIG. 21 includes a 2-bit error. As described above, the occurrence of the first pattern of operation causes a random error.

As shown in FIG. 22, in the second pattern, all magnetic walls are shifted to unintended positions. That is, all magnetic walls are each shifted from a boundary of a unit portion ML where each magnetic wall is positioned before the shift to a boundary of two boundaries ahead. As a result, it is understood from the example pattern of bits in the string STR shown in FIG. 22 that the memory cells MC_7, MC_4, MC_3, MC_2, and MC1 include errors of five bits in total. Furthermore, since bits of the memory cell MC_8 cannot be kept empty in spite of the magnetization of the unit portion ML_1 not being oriented based on a value to be stored, an appropriate value is inserted into the memory cell MC_8. This value may function as an error. Furthermore, between before and after the magnetic wall shift, most of the bits are only misaligned, and the information itself is not lost. However, before the data read based on the magnetization of a distal unit portion ML (i.e., in the example of the drawing, the unit portion ML_8) is performed before the shift, the magnetization information that the unit portion ML_8 had before the shift is lost due to the magnetic wall shift. Therefore, information of one bit (i.e., "1" data by the memory cell MC_1 before the shift in the example shown in the drawing) is lost. As described above, a burst error occurs due to the occurrence of the magnetic shift of the second pattern.

The magnetic shift of the second pattern is due to the intrinsic structure and operation of the FIFO type magnetic memory. This makes it difficult to sufficiently suppress the occurrence of the magnetic shift in the second pattern. Errors due to the second pattern may be corrected using encoding for data to be written into a plurality of strings. However, such a correction requires a very large number of strings, that is, magnetic thin wires. This causes a great increase in manufacturing cost and an area of a magnetic memory.

The memory system 1 according to the first embodiment generates a first-type codeword from data to be written into the plurality of strings STR, and writes data including the first-type codeword into the magnetic memory 2. The first-type codeword can correct an error in number based on a rank. As long as the error rank is equal to or smaller than t, which is the number of correctable ranks per first-type codeword, a burst error can be corrected even if the first-type codeword includes the burst error.

The memory system 1 uses the first-type codeword based on the rank. As is evident from the description made with reference to FIG. 10, the first-type codeword can be generated by providing an error correction code in the direction in which the string STR extends. Despite the fact that the error correction code is added in the direction in which the string STR extends, many errors that line up in the direction in which the string STR extends, such as burst errors, can be corrected. This eliminates the necessity of providing a large number of magnetic bodies UT in order to correct many errors that line up in the direction in which the string STR extends. Accordingly, the magnetic memory 2 having a small area can be manufactured.

The memory system 1 generates a second-type codeword from a string of bits to be written into one string STR, and writes the second-type codeword to one string STR. In the case where read request target user data including no errors is obtained by decoding of the second-type codeword, the first-type decoding is not performed. Therefore, in the case of no occurrence of a burst error, data can be read in a short time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a memory including a plurality of magnetic bodies extending in a first direction, the magnetic bodies each including a plurality of portions aligned in the first direction; and
   a memory controller including an encoder including a first encoder configured to generate a first codeword from a plurality of first data sections, the first codeword including a first error correction code parity for correcting errors in number based on a rank in the plurality of first data sections and the first codeword, the first codeword including a plurality of first bit strings respectively associated with a plurality of columns, the first bit strings each including a plurality of bits respectively associated with a plurality of rows, the memory controller being configured to write the plurality of first bit strings into the plurality of magnetic bodies, respectively, such that the magnetic body in which one of the first bit strings is written is different from those in which another one of the first bit strings is written.

2. The memory system according to claim 1, wherein
   the memory controller is configured to receive a plurality of pieces of first-type data,
   each of the plurality of pieces of first-type data includes a set of sections,
   a section of the set of sections included in the each of the plurality of pieces of first-type is included in one of the plurality of first data sections, and
   another section of the set of sections included in the each of the plurality of pieces of first-type is included in another one of the plurality of first data sections.

3. The memory system according to claim 2, wherein
   the memory controller is configured to receive a write request with data of a first size being a minimum unit, and
   each of the plurality of pieces of first-type data has the first size.

4. The memory system according to claim 3, wherein the memory controller is configured to receive the plurality of pieces of first-type data from an outside of the memory system.

5. The memory system according to claim 4, wherein
   the plurality of first bit strings include n first bit strings (where n is an integer equal to or greater than 2), and
   all sections of one of the plurality of pieces of first-type data are included in m bit strings of the plurality of first bit strings (where m is an integer smaller than n).

6. The memory system according to claim 1, wherein
   the memory controller is configured to receive first-type data from an outside of the memory system, and
   a subset of the plurality of first data sections is a section of a combination of the first-type data and second-type data.

7. The memory system according to claim 6, wherein the second-type data includes a cyclic redundancy check code of the first-type data.

8. The memory system according to claim 1, wherein the memory controller is configured to generate a second codeword, the second codeword including a second error correction code parity for correcting errors in number based on a rank in the second codeword, and including a plurality of second bit strings respectively associated with a plurality of columns;
   the second error correction code parity is generated by the first encoder,
   the memory controller is configured to generate a plurality of third codewords based on a plurality of pieces of first data,
   the memory controller is configured to write the plurality of third codewords into the plurality of magnetic bodies, each of the plurality of third codewords corresponding to each of the plurality of magnetic bodies,
   the memory controller includes a second encoder different from the first encoder, and
   each of the plurality of third codewords includes a third error correction code parity generated based on each of the plurality of pieces of first data by the second encoder.

9. The memory system according to claim 8, wherein the plurality of third codewords are BCH codes.

10. The memory system according to claim 9, wherein
    each of the plurality of pieces of first data includes one of the plurality of first bit strings and one of the plurality of second bit strings,
    one of the plurality of first bit strings included in one of the plurality of pieces of first data is different from one of the plurality of first bit strings included in another one of the plurality of pieces of first data, and
    one of the plurality of second bit strings included in the one of the plurality of pieces of first data is different from one of the plurality of second bit strings included in the another one of the plurality of pieces of first data.

11. The memory system according to claim 10, wherein
    the memory system is connectable to a host device, and
    the memory controller is configured to read the plurality of third codewords in a case where data corresponding to an address designated by a read request received from the host device is stored over the plurality of magnetic bodies.

12. The memory system according to claim 11, further comprising a decoder including a first decoder corresponding to the first encoder and a second decoder corresponding to the second encoder, wherein the memory controller is configured to cause the second decoder to decode the read plurality of third codewords.

13. The memory system according to claim 12, wherein the memory controller is configured to transmit, in a case where decoding of the read plurality of third codewords by the second decoder is successful, data corresponding to the address in the decoded data to the host device.

14. The memory system according to claim 12, wherein the memory controller is configured to cause the first decoder to decode the read plurality of third codewords using the first codeword and the second codeword included in the read plurality of third codewords in a case where decoding of the read plurality of third codewords by the second decoder fails.

15. The memory system according to claim 12, wherein the memory controller is configured to:
cause, in a case where decoding of at least one of the read plurality of third codewords by the second decoder fails, the first decoder to decode the first codeword including one of the plurality of first bit strings included in the one of the read plurality of third codewords and one of the plurality of first bit strings included in a second one of the read plurality of third codewords different from the one of the read plurality of third codewords,
cause the first decoder to decode the second codeword including one of the plurality of second bit strings included in the one of the read plurality of third codewords and one of the plurality of second bit strings included in the second one of the read plurality of third codewords, and
transmit, in a case where the decoding of the first codeword and the decoding of the second codeword is successful, data corresponding to the address in the decoded data to the host device.

16. The memory system according to claim 1, wherein the first error correction code parity includes a plurality of third bit strings respectively corresponding to the plurality of columns, and
each of the first bit strings includes each of the third bit strings.

17. The memory system according to claim 1, wherein the memory is configured to set magnetization to first one of the plurality of portions of one of the magnetic bodies, and read data based on a direction of magnetization in second one of the plurality of portions of the one of the magnetic bodies, the first one of the plurality of portions being position at a first end of the one of the magnetic bodies, the second one of the plurality of portions being position at a second end of the one of the magnetic bodies.

18. The memory system according to claim 17, wherein the first codeword is a codeword of a rank metric code.

19. The memory system according to claim 1, wherein the first codeword is a codeword of a rank metric code.

* * * * *